United States Patent [19]

Hayashi

[11] Patent Number: 5,708,886
[45] Date of Patent: Jan. 13, 1998

[54] CAMERA

[75] Inventor: Eiichi Hayashi, Omiya, Japan

[73] Assignee: Fuji Photo Optical Co., Ltd., Saitama, Japan

[21] Appl. No.: 718,209

[22] Filed: Sep. 20, 1996

Related U.S. Application Data

[63] Continuation of Ser. No. 292,207, Aug. 18, 1994, abandoned.

[30] Foreign Application Priority Data

| Aug. 23, 1993 | [JP] | Japan | 5-207809 |
| Aug. 26, 1993 | [JP] | Japan | 5-211857 |
| Aug. 30, 1993 | [JP] | Japan | 5-214157 |
| Aug. 30, 1993 | [JP] | Japan | 5-214158 |
| Sep. 6, 1993 | [JP] | Japan | 5-221262 |
| Oct. 4, 1993 | [JP] | Japan | 5-248050 |

[51] Int. Cl.$^6$ ................................................. G03B 13/12
[52] U.S. Cl. .............................. 396/379; 396/382; 396/84
[58] Field of Search .................................. 396/379, 382, 396/84, 75

[56] References Cited

U.S. PATENT DOCUMENTS

| 4,340,291 | 7/1982 | Berg | 354/289.12 |
| 4,945,372 | 7/1990 | Higuchi et al. | 354/222 |
| 5,036,346 | 7/1991 | Hatamori et al. | 354/199 |
| 5,068,678 | 11/1991 | Mogamiya et al. | 354/222 |
| 5,333,024 | 7/1994 | Labaziewicz | 354/195.12 |
| 5,438,381 | 8/1995 | Mogamiya et al. | 354/222 |

FOREIGN PATENT DOCUMENTS 4-7535  1/1992  Japan ................................. 354/222

Primary Examiner—Safet Metjahic
Assistant Examiner—Michael Dalakis
Attorney, Agent, or Firm—Oliff & Berridge

[57] ABSTRACT

A camera is applied to a compact camera or a VTR integrated with a simplified camera. A cam cylinder is used as lens driving mechanisms for a photographing optical system and a finder optical system. A moving lens frame and a connecting member provided with a cam dependent moving member are connected with an elastic member for forcing in a direction approaching each other, and then when an external force is added to the moving lens frame, the zoom lens system can be prevented from being damaged. A space near a focal surface is sealed up by a taking lens frame and a concave portion of a case, whereby the focal surface can be kept from collecting dust. Further, both end portions of a guide pole for guiding the taking lens frame so as to move back and forth in the case are press fitted into through holes formed at front and rear ends of the case and supported, whereby the guide pole can be assembled easily. Plural cylindric pins are formed at corner portions of a rectangular lens, and then the pins come in contact with flat portions formed at corner portions of an adjacent lens, so that plural lenses can be held in predetermined intervals without an interval ring. Further, a back focus can be adjusted from the front of the zoom lens system and the focus of image can be kept though the case expands or contracts because of a temperature change.

13 Claims, 15 Drawing Sheets

CAMERA

This is a Continuation of application Ser. No. 08/292,207 filed Aug. 18, 1994, now abandoned.

BACKGROUND OF THE INVENTION

1. Field of the Invention

The present invention relates to a camera, more particularly it relates to a camera which is applied to a compact camera or a VTR integrated with a simplified camera.

2. Description of the Related Art

Conventionally, in such a camera, the finder lens of the finder optical system is moved in accordance with the zooming movement of the taking lens in the photographing optical system, whereby the photographing magnification corresponds to the finder magnification.

In the above-mentioned camera, the taking lens is moved by one cam cylinder and the finder lens is moved by another lens driving mechanism.

However, in the conventional camera, the respective lens driving mechanisms are provided, therefore, there is a disadvantage in that the number of parts increases and it takes a lot of time for assembling.

Now, there is the zoom lens system in which the dependent moving pin implanted on the periphery of the lens frame is put into the cam groove formed on the peripheral surface of the cam cylinder, and the cam cylinder is rotated by the motor so as to move the lens frame back and forth along the cam groove in the direction of the photographing optical axis, whereby the photographing magnification is changed.

The camera, in which the zoom lens system like this is built, cannot obtain enough of a moving stroke of the lens frame when the lens frame is moved within the depth of the camera body, therefore, there are some recent cameras in which the front end of the taking lens barrel is projected from the front of the camera body during the zooming movement. According to these cameras, the moving stroke of the lens frame can be lengthen compared with the depth of the camera body, therefore, the camera can be made compact and can photograph in a high magnification.

Now, in the above-mentioned zoom lens system, when the lens frame is projected from the front of the camera body, there is a case in that the projected lens frame is given with an external power carelessly. In this case, there is a disadvantage in that the dependent moving pin and/or the cam cylinder are damaged since the lens frame is put into the cam groove of the cam cylinder and the external power is given to the dependent moving pin and/or the cam groove directly.

Further, in the zoom lens system like this, the ring-shaped photograph lens frame for holding the taking lens is moved back and forth along the photographing optical axis within the lens barrel to thereby zoom, and then the subject image is formed on the image-formation surface of the CCD or the film which is positioned in the rear of the lens barrel.

However, in the conventional zoom lens, when dust enters the lens barrel, there is a disadvantage in that a clear image cannot be captured since the dust is adhered to the low-pass filter of the CCD or the film which is positioned in the rear of the lens.

In the zoom lens, the plural taking lens frames, which hold the taking lenses, are guided by the plural guiding poles which are arranged in the case and are moved back and forth along the photographing optical axis within the case to thereby zoom.

The guide pole, first, is positioned by inserting the rear end thereof in the concave portion which is formed in the rear end of the case, and the photographing lens frames are guided with the guide poles respectively. Thereafter, the front end of the guide pole is inserted in the concave portion which is formed in the frame which is fixed at the front end of the case, whereby the pole is supported with the case.

However, in the conventional zoom lens system, there is a disadvantage in that it is hard to assemble since the guide pole is apt to fall down after inserting the front end of the guide pole in the concave portion formed in the frame.

Further, there is another disadvantage in that it is hard to assemble since the front end of the guide pole and the concave portion of the frame cannot be fitted while making sure of the position with the naked eye, when there are a lot of poles.

Conventionally, plural lenses for the photographing optical system and the finder optical system in the camera are held with the lens frames through the ring-shaped interval ring, whereby the interval between the lenses is kept in the predetermined space.

However, in the conventional lens, there are disadvantages in that the number of the parts increases and it is hard to assemble since the lens and the interval ring are inserted alternately in the lens frame to thereby keep the lens interval.

Moreover, there is an outside-cam-type zoom lens system in which a cam cylinder (hereinafter, called "side cam cylinder") is positioned at the side of the plural moving lens groups which are put in the case.

In this zoom lens system, the cam followers, which are provided on the lens frames of the moving lens groups, are put into the plural cam groove formed on the side cam, and the side cam cylinder is rotated so as to move the respective moving lens groups in the optical axis direction back and forth with the predetermined relation, whereby the subject image is formed on the focal surface which is positioned at the rear end of the case.

The front end of the side cam cylinder is supported rotatably by the front through a hole which is formed at the case, and the rear end of the side cam cylinder is supported rotatably by the rear through hole, which is formed at the case, through the spring which forces the side cam forward. A screw member is provided at the front through hole of the inside of the case, and the screw member is pushed into so as to come in contact with the front end of the side cam cylinder, whereby the side cam cylinder is moved against the force of the spring by the fine adjustment. With this arrangement, the lens frame is moved back and forth to adjust the back focus.

However, in the conventional zoom lens system, the position of the side cam cylinder shifts in regard to the rear end of the case in the optical axis direction with the expansion and contraction by the temperature change since the front end of the side cam cylinder is pushed against the case, and then the positional relationship between the respective moving lens groups in regard to the focal surface, therefore, there is a disadvantage in that the focus point is out of focus.

SUMMARY OF THE INVENTION

The first present invention has been developed to eliminate the above-described disadvantage and has as its aim the provision of a camera wherein one lens driving mechanism is used both for the photographing optical system and for the finder optical system.

To achieve the above-described aim, a camera comprises a photographing optical system for holding taking lens groups and provided with a taking lens frame which is movable back and forth along a photographing optical axis; a finder optical system for holding finder lens groups and provided with a finder lens frame which is movable back and forth along a finder optical axis; and a cam cylinder having formed cam grooves on a peripheral surface, into which respective cam followers projected from said taking lens frame and said finder lens frame are put, and rotated so as to move said taking lens frame and said finder lens frame back and forth along said cam grooves respectively, so that a photographing magnification and a finder magnification are changed and corresponded.

According to this first invention, the cam followers of the taking lens frame in the photographing system and the followers of the finder lens frame in the finder optical system are put into the cam grooves of the common cam cylinder. Therefore, when the cam cylinder is rotated, the taking lens frame and the finder lens frame move together along the respective cam grooves in the photographing optical direction and in the finder optical direction.

Further, in this first invention, the display member, which enters the finder visual field when the power switch of the camera is turned off and retracts from the finder visual field the when the power switch of the camera is turned on, is driven and controlled by the cam cylinder.

Moreover, in this first invention, the case of the photographing optical system and the case of finder optical system are combined and formed in one common case, therefore, the assembling becomes easy.

The second present invention has been developed to eliminate the above-described disadvantage and has as its aim the provision of a camera provided with a zoom lens system which is not damaged though an external power is applied to the lens frame.

To achieve the above-described aim, a camera provided with a zoom lens system comprises a moving lens frame for holding taking lenses and is movable back and forth along a photographing optical axis in a case; a connecting member provided with a cam follower; a cam cylinder provided with cam grooves into which the cam follower of said connecting member is put, and rotated so as to move the connecting member back and forth along the photographing optical axis and, an elastic member for connecting said moving lens frame and said connecting member by forcing in a direction approaching each other; wherein said cam cylinder is rotated to thereby move the moving lens frame back and forth through said elastic member and said connecting member, so that a photographing magnification is changed.

According to this second invention, the moving lens frame and the connecting member are connected with the elastic member which forces in a direction approaching each other, therefore, when the external force is applied to the moving lens frame projected from the front of the camera body, the moving lens frame moves to the rear of the photographing optical axis against the pushing force and the external force is absorbed. With this arrangement, though the external force is added to the moving lens frame, there is no anxiety about damaging the cam follower, cam grooves and the like.

The third present invention has been developed to eliminate the above-described disadvantage and has as its aim the provision of a camera provided with a zoom lens system which has a dust-proof structure to prevent dust or the like from adhering on the image formation surface.

To achieve the above-described aim, in a camera provided with a zoom lens system in which plural taking lens frames for holding taking lenses are moved back and forth along a photographing optical axis in a case so as to zoom, and a subject image is formed on a focal surface arranged at a rear end of said case, a rear taking lens frame of the plural taking lens frames is formed in a cylinder shape of which a rear end is open; and, a cylinder portion for surrounding said focal surface is provided and projected forward in the photographing optical axis at a rear end in the case, and the rear taking lens frame moves back and forth in a state that it is fitted with the cylinder portion of the case.

According to this third invention, the rear taking lens frame moves back and forth in the state that it is fixed with the cylinder portion projected from the case.

Therefore, the space near the focal surface is sealed up with the taking lens frame and the cylinder portion of the case, so that the dust not is collected on the focal surface though the dust and the like enter the case.

Further, according to this third invention, the front taking lens frame is formed in a cylinder and moves back and forth within the part of the moving area in the state that it is fixed with the rear taking lens frame.

Therefore, the space near the taking lens is sealed up with two taking lens frames, so that the dust is not collected on the taking lens though dust and the like enter the case.

The fourth present invention has been developed to eliminate the above-described disadvantage and has as its aim the provision of a camera provided with a zoom lens system in which a guide pole can be assembled easily.

To achieve the above-described aim, in a camera provided with a zoom lens system in which plural taking lens frames for holding taking lenses are guided with plural guide poles in a case and moved back and forth along a photographing optical axis in a case so as to zoom, both ends of said plural guide poles are press fitted into through holes formed at a front end and a rear end of the case, so that said plural guide poles are supported.

According to this fourth invention, the rear end portion of the guide pole is press fitted and fixed to a through hole which is formed at the rear end of the case, so that the guide pole can be kept from falling down. Further, the front end portion of the guide pole is press fitted into a through hole formed at the front end of the case with the naked eye, therefore, the guide poles can be assembled easily though the number of the guide poles is large.

The fifth present invention has been developed to eliminate the above-described disadvantage and has as its aim the provision of a camera in which respective lenses can be fixed to a lens frame at a predetermined interval.

To achieve the above-described aim, a camera is characterized in that a plurality of pins in cylinder shapes are formed at corner portions of a lens in a rectangular shape and receiving portions consisting of flat portions are formed at corner portions of adjacent lens to the lens in a rectangular shape, and then said pins come in contact with the receiving portions of the adjacent lens in a rectangular shape and so as to keep a lens interval at a predetermined interval.

According to this fifth invention, the pins in cylinder shapes are formed at corner portions of the lens are in contact with the receiving portions consisting of flat portions formed at corner portions of adjacent lens. Therefore, the lenses can be held in the predetermined intervals.

The sixth present invention has been developed to eliminate the above-described disadvantage and has as its aim the provision of a camera provided with a zoom lens system in which a focus point is not out of focus though a case expands or contracts by temperature change.

In this way, the lens intervals can be kept without interval rings, so that the number of parts can be reduced and the lens can be fixed to the lens frame easily.

To achieve the above-described aim, in a camera provided with a zoom lens system in which a cam cylinder formed with plural cam grooves is placed at a side of plural moving groups in a case and cam followers provided with lens frames of said cam grooves are put into the cam grooves, respectively, and then said cam cylinder is rotated to thereby move the respective moving lens groups back and forth in an optical axis direction with a predetermined relationship so as to zoom, said zoom lens system comprises an axis stored in said cam cylinder coaxially for supporting said cam cylinder movably in said optical axis direction and supported rotatably at a front end portion and a rear end portion by said case; forcing means for forcing said axis backward such that the rear end portion of said axis comes in contact with said case; and, an adjustment screw member for connecting said cam cylinder and said axis and for moving said cam cylinder in regard to the axis in said optical axis direction by being rotated from a front of said case; wherein said adjustment member is rotated so as to move said respective moving lens groups through said cam cylinder in said optical axis direction, whereby said moving lens groups are focused on a focal surface at the rear end portion of said case.

According to this sixth invention, the cam cylinder is supported so as to be movable in the optical axis direction with the axis which is stored in the cam cylinder coaxially, and the front and rear end portions of the axis are supported with the case rotatably. The axis is pushed back by the forcing means and the rear end portion of the axis comes in contact with the rear end of the case. Further, the cam cylinder and the axis are connected with the adjustment screw member in a manner that the cam cylinder moves in the optical axis direction in regard to the axis when the adjustment screw member is rotated, and the adjustment screw member is placed so as to be rotatable from the front of the case. Therefore, the rear end portion of the axis is in contact with the rear end of the case with the pushing force of the forcing means, so that the moving lens groups are placed based on the rear end of the case. Further, the adjustment screw member is rotated from the front of the zoom lens system so as to move the moving lens group in the optical axis direction through the cam cylinder, whereby the back focus is adjusted.

BRIEF DESCRIPTION OF THE DRAWINGS

The exact nature of this invention, as well as other aims and advantages thereof, will be readily apparent from consideration of the following specification relating to the accompanied drawings, in which like reference characters designate the same or similar parts throughout the figures thereof and wherein.

DESCRIPTION OF THE PREFERRED EMBODIMENT

A detailed description will hereafter be given of the preferred embodiment of the camera according to the present invention with reference to the accompanying drawings.

Figure 1:
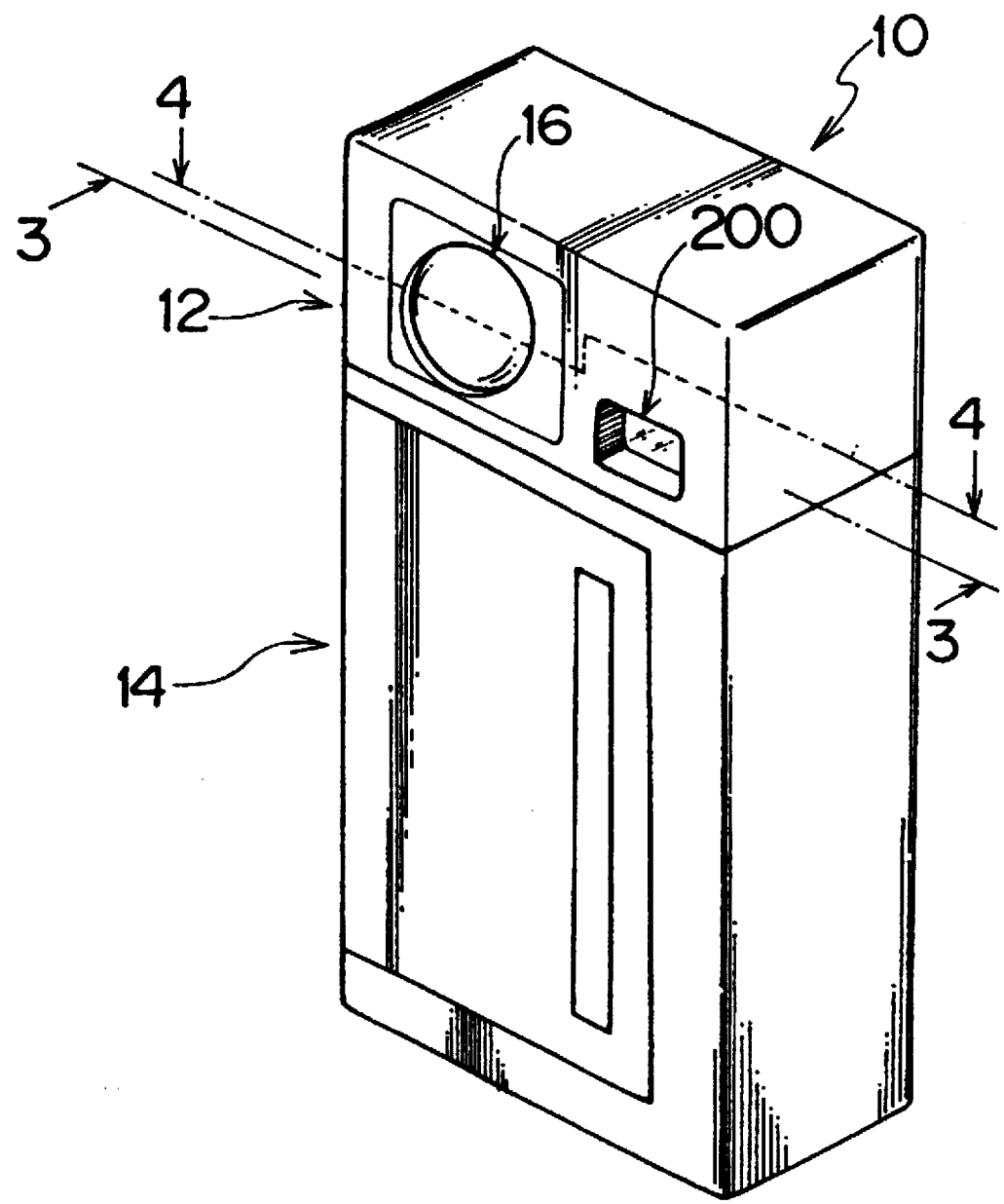
FIG. 1 is a perspective view showing a VTR integrated with a camera applied to a camera according to the present invention.

FIG. 1 is a perspective view showing an external appearance of a VTR integrated with a camera, which is applied to a camera according to the first present invention. The VTR 10 integrated with the camera consists of a camera portion 12 and deck portion 14, and further the camera portion 12 is composed of a zoom lens system 16 and a finder portion 200, and a loading system and the like for a video cassette tape are provided in the VTR deck portion 14.

Figure 2:
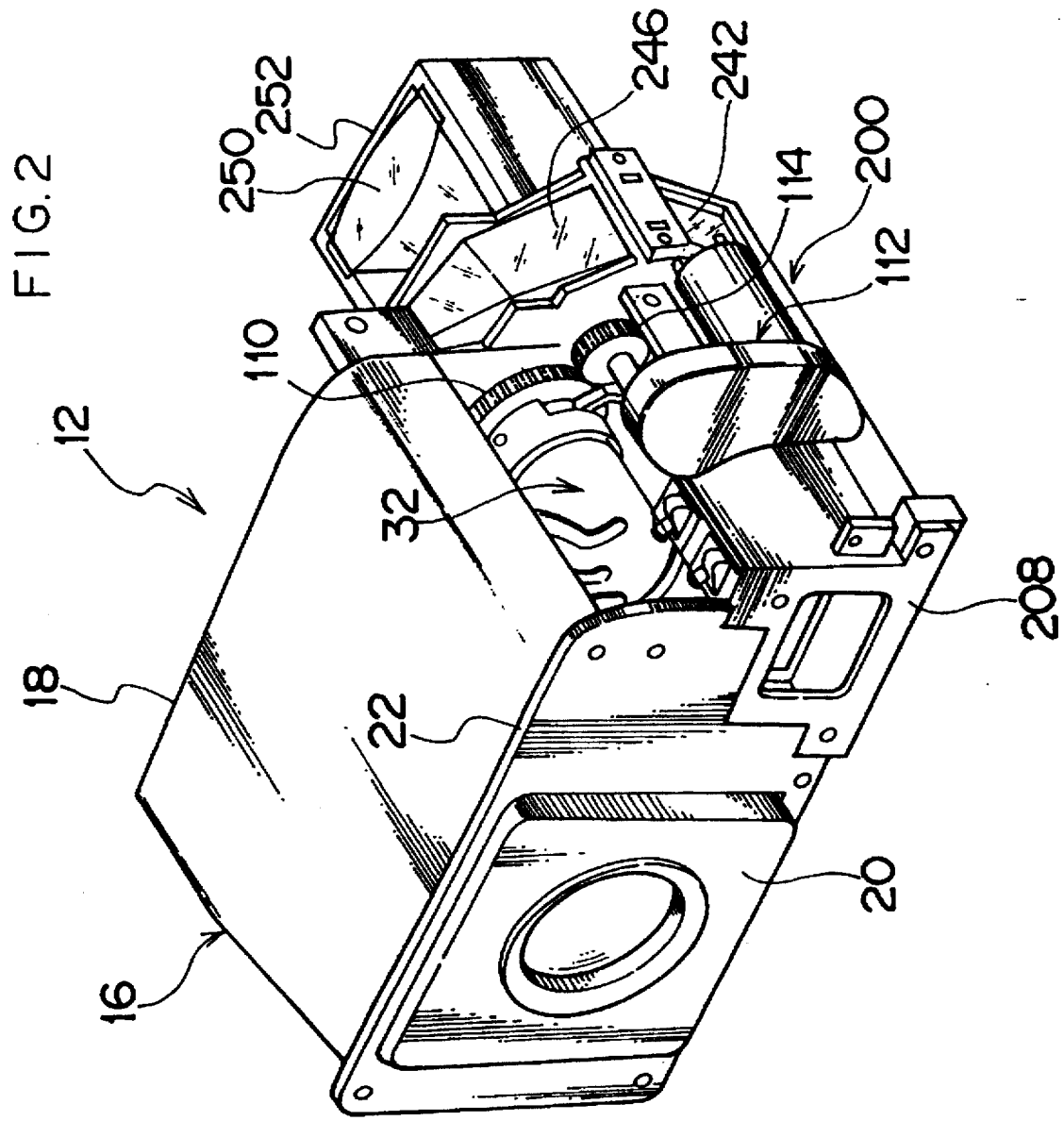
FIG. 2 is a perspective view showing a camera portion of the VTR integrated with the camera sown in FIG. 1.
Figure 3:
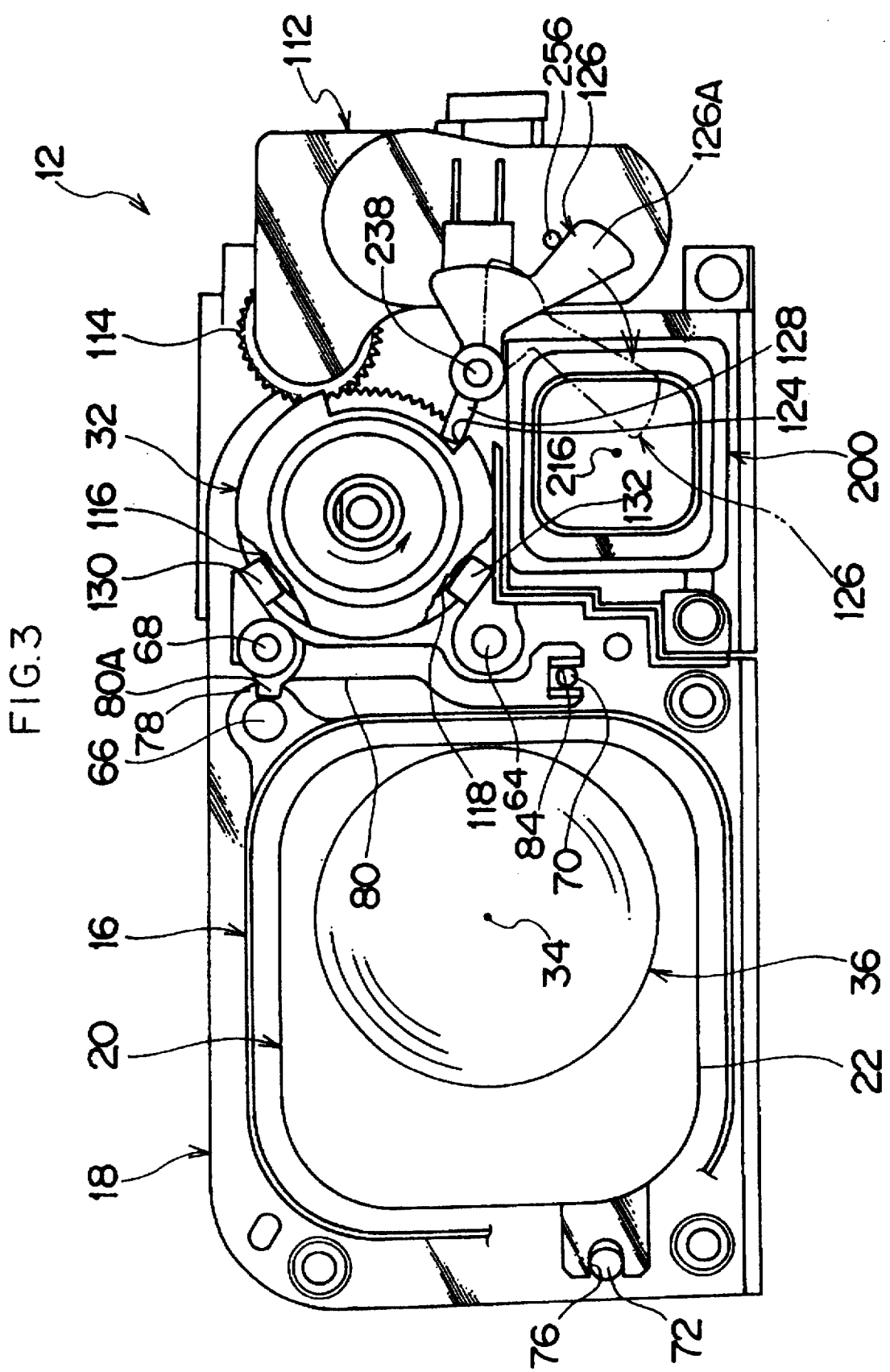
FIG. 3 is a front view showing a zoom lens system and a finder portion, shown from line 3—3 in FIG. 1.
Figure 4:
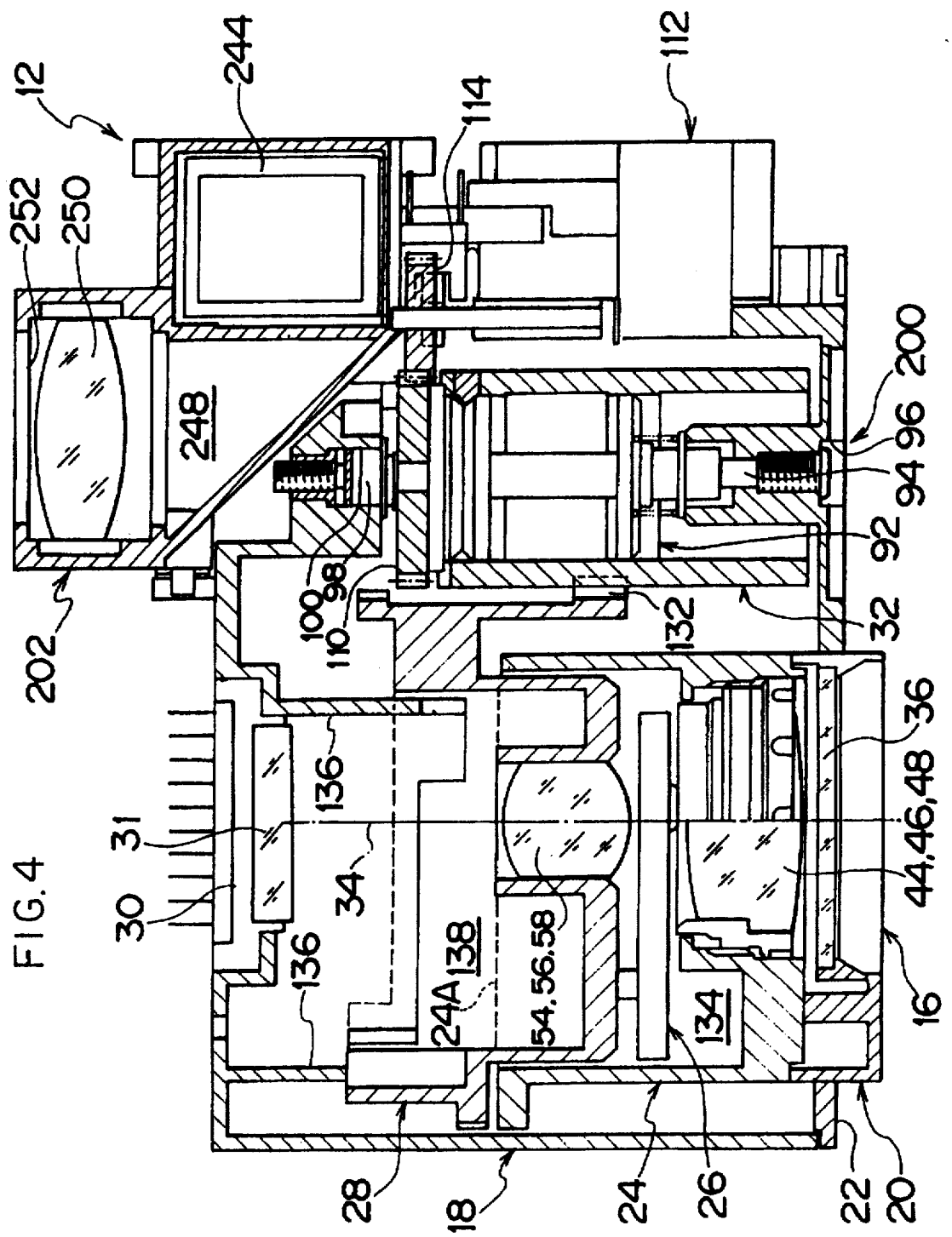
FIG. 4 is a sectional view showing the zoom lens system and the finder portion taken on line 4—4 in FIG. 1.

FIG. 2 is a perspective view showing the outline of the camera portion 12, FIG. 3 is a front view showing the zoom lens system 16 and the finder portion 200, shown from line 3—3 in FIG. 1, and FIG. 4 is a sectional view taken on line 4—4 in FIG. 1. Further, FIGS. 5 and 6 are exploded perspective views showing a front portion and a rear portion of the zoom lens system 16.

Figure 5:
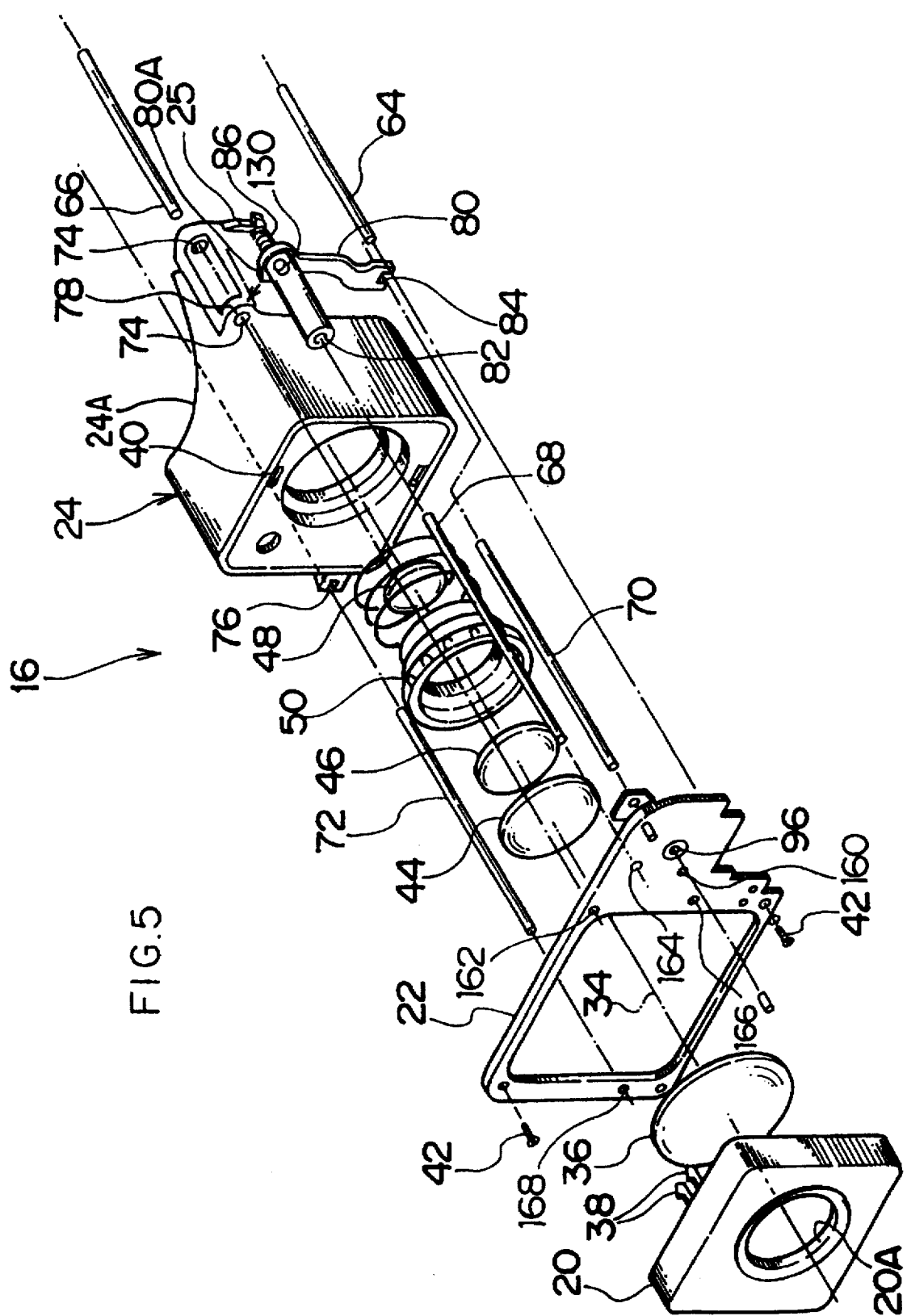
FIG. 5 is an assembly perspective view showing a zoom lens system applied to a camera according to the present invention and further showing a first moving frame.
Figure 6:
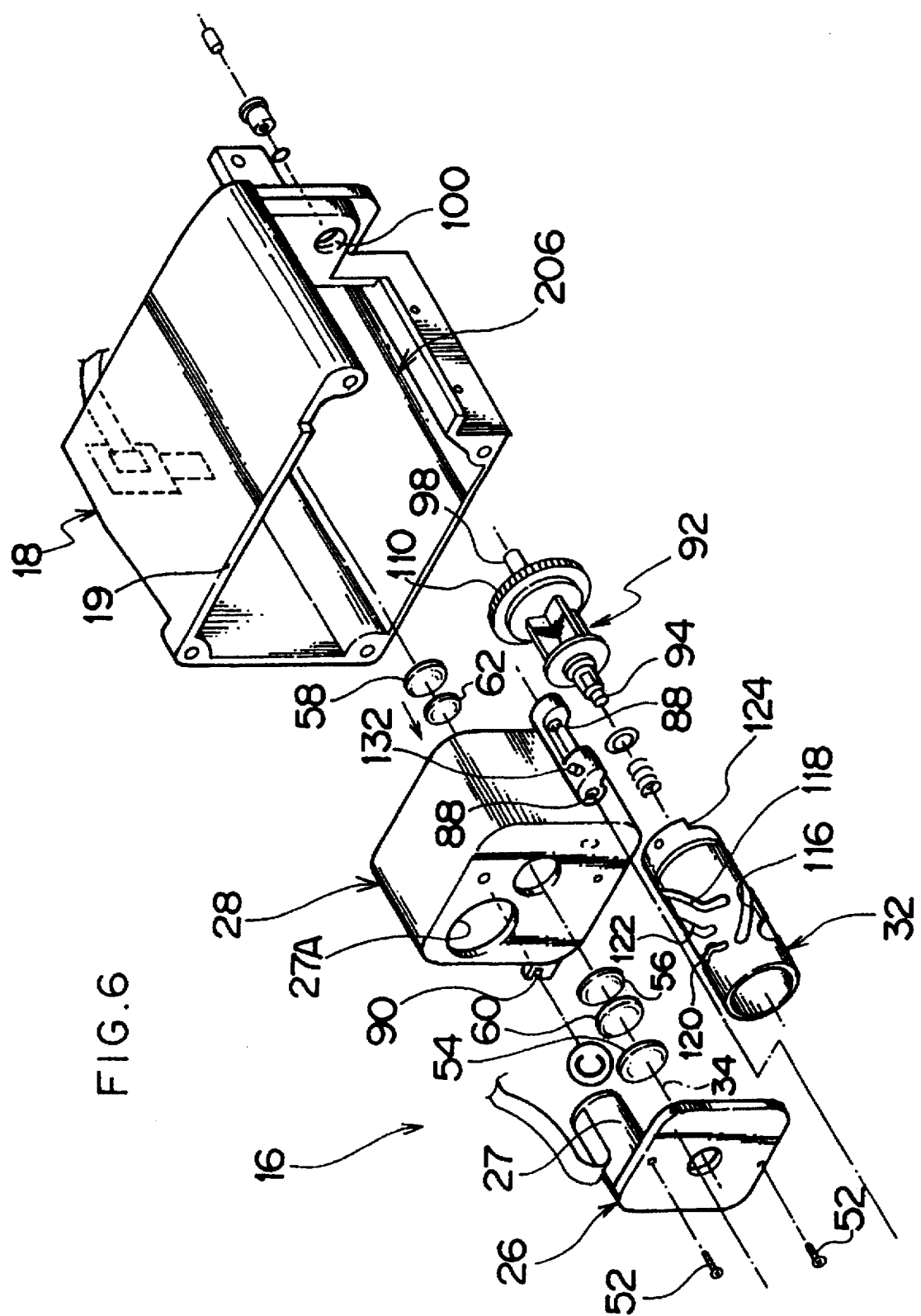
FIG. 6 is an assembly perspective view showing a zoom lens system applied to a camera according to the present invention and further showing a second moving frame.

The zoom lens system 16 and the finder portion 200 are arranged in parallel in a case 18 shown in FIGS. 2 and 3, and, as shown in FIGS. 5 and 6, the zoom lens system 16 is provided with a front frame 20, a fixed frame 22, a first moving frame 24, an iris unit 26 and a second moving frame as main members. A CCD unit 30 is attached to the rear portion of the case 18 suitable for the zoom lens system 16. And, a side cam cylinder 32 and a photographing optical axis 34, described later, are arranged in parallel at the side of the photographing optical system in the case 18.

As shown in FIGS. 5 and 6 a cover glass 36 is attached to the opening 20A of the front frame 20, and a pawl portion 38 formed on the front frame 20 is fit into a hole 40 of the first moving frame 24, whereby the front frame 20 is fixed to the first moving frame 24. The fixed frame 22 is fixed to the front edge 19 of the case 18 with screws 42, 42.

On the other hand, three taking lenses 44, 46, 48 are fixed by the first moving frame 24 through a lens frame 50. The iris unit 26 is fixed at the front side of the second moving frame 28 with screws 52, 52, and an iris meter 27 of the iris unit 26 is inserted into the opening 27A of the second moving frame 28.

Three lenses 54, 56, 58 are arranged in the second moving frame 28 through an interval ring 60 and a stopper ring 62.

Five guide poles 64, 66, 68, 70, 72 are provided parallel to the photographing optical axis 34 in the case 18, and the front ends of guide poles 64–72 are put into holes formed at the fixed frame 22 under pressure and fixed and the rear ends are put into holes, not shown, formed at the rear wall portion under pressure and fixed, respectively.

The guide pole 66 is put into and through guide holes 74, 74 formed on the first moving frame 24 and the guide pole 72 is positioned at a deflection-proof groove 76, whereby the first moving frame 24 can be moved back and forth by guiding with the guide poles 66, 72. And, the guide pole 68 is put into and through a guide hole 82 of a connecting coma 80, described later, and the guide pole 64 is positioned at a deflection-proof groove 84.

The guide pole 64 is put into and through a pair of guide holes 88, 88 and the guide pole 72 is positioned at a deflection-proof groove 90, whereby the second moving frame can be moved back and forth by guiding with the guide poles 64, 72.

Figure 7:
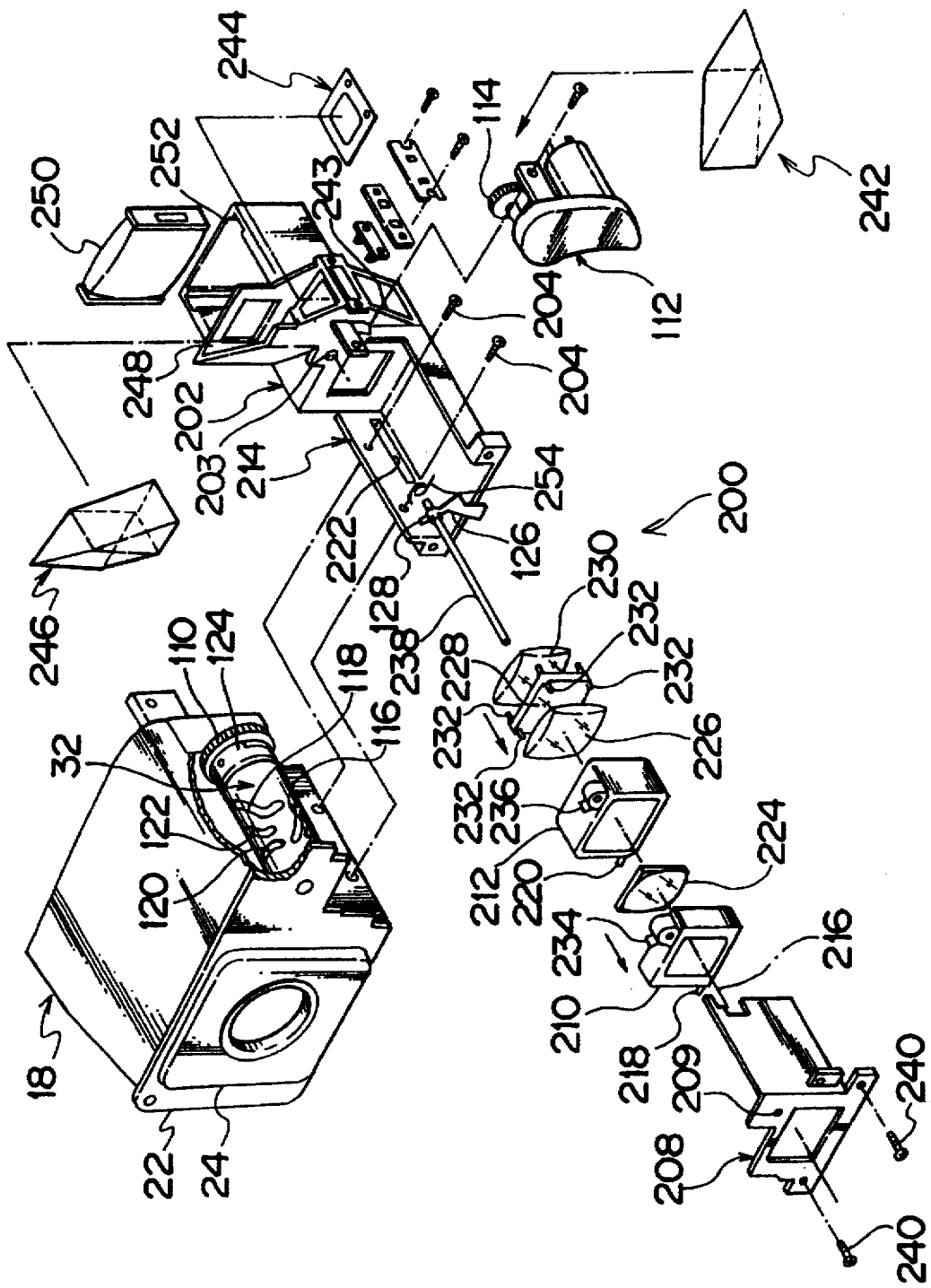
FIG. 7 is an assembly perspective view showing the finder portion.

On the other hand, the side cam cylinder 32 shown in FIGS. 6 and 7 is placed at the side of the first moving frame 24 and the second moving frame 28. An axis 92 is inserted into the side cam cylinder 32 and then fixed. The front end 94 of the axis 92 is supported rotatably with the hole 96 of the fixed frame 22, as shown in FIG. 5, and the rear end thereof 98 is supported rotatably with the hole 100 of the case 18, as shown in FIG. 6, whereby the axis 92 can be rotatable.

A gear 110 is integrated with the axis 92 and engaged with a gear 114 of a motor 112, described later. Therefore, the driving force comes from the motor 112 through the gears 114, 110 so that the side cam cylinder 32 is rotated.

As shown in FIGS. 6 and 7, four cam grooves 116, 118, 120, 122, are formed on the peripheral surface of the side cam cylinder 32. A cam 124 is formed at the rear edge of the side cam cylinder 32, and then is fit with a pin 128 of a display plate 126, described later, (see FIG. 3).

Figure 8:
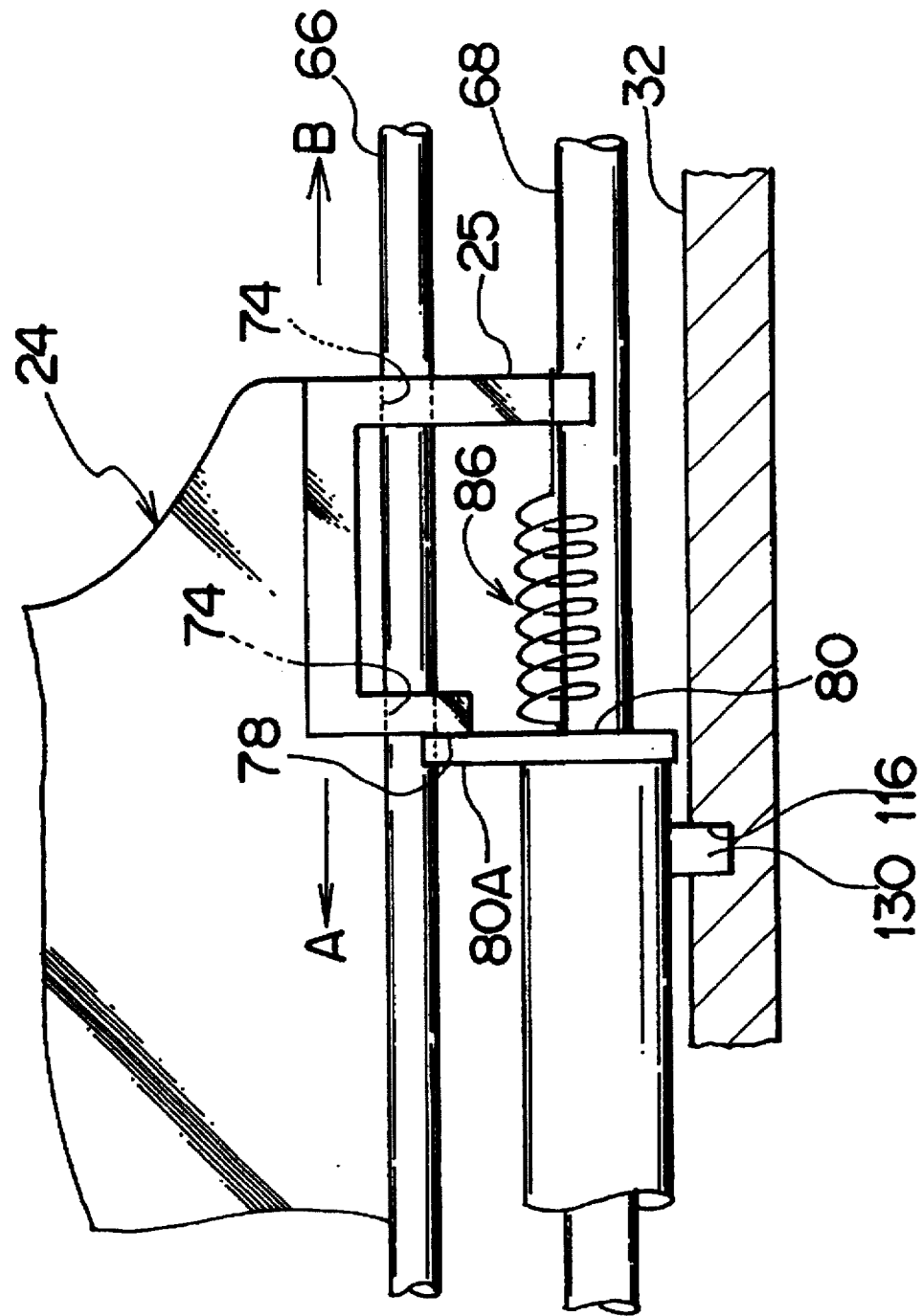
FIG. 8 is an explanatory view showing a connecting state between the first moving frame and a connecting coma of the zoom lens system applied to the camera according to the present invention.

A dependent moving pin 130 of the connecting coma 80, shown in FIG. 5, is put into the cam 116. The connecting coma 80 is connected with a projectile piece 25 fixed to the first moving frame 24 through a tension spring 86, and the upper end 80A of the connecting coma 80 is pushed against the front side portion 78 of the first moving frame 24 by the pushing force of the tension spring 86 as shown in FIG. 8. With this arrangement, the first moving frame 24 is pushed forward in the direction of the optical axis 34 by the pushing force of the tension spring 86. The tension spring 86 has the power by which the first moving frame 24 can be moved to the rear side of the camera concerning the connecting coma 80 when an external force is given to the first moving frame 24.

A dependent moving pin 132 of the second moving frame 28 shown in FIG. 6 is put into the cam 118. Therefore, when the side cam cylinder 32 is rotated, the first moving frame 24 and the second moving frame 28 can be moved back and forth along the cams 116, 118 in the approaching direction each other (tele side direction) on the photographing optical axis 34 and in the separating direction each other (wide side direction). With this arrangement, the photographing magnification of the subject image can be changed.

As shown in FIG. 7, the finder main body 202 of the finder portion 200 is fixed to the side opening 206 (see FIG. 6) with screws 204, 204. And, the finder main body 202 holes a fixed frame 208, a front moving frame 210, a rear moving frame 212, the display plate 126, and a plural prisms, described later.

The finder main body 202 has a guide plate 214 formed and projected forward, and the front moving frame 210 and the rear moving frame are arranged to the guide plate 214 on the finder optical axis 216. Guide pins 218, 220 fixed to the sides of the front moving frame 210 and the rear moving frame 212 are put into a straight groove 222 opened at the side of the guide plate 214, whereby the front moving frame 210 and the rear moving frame 212 is movable back and forth along the straight groove 222.

A variable magnification lens 224 is attached to the front moving frame 210 as a finder lens, and three correction lenses 226, 228, 230 are attached to the rear moving frame 212. The lens 228 is formed in a rectangular shape, and interval pins 232, 232 . . . are formed and integrated with the lens 228 at the corners thereof by two. The pins 232, 232 . . . are touched with the corners of the lenses 226, 230 when the correction lens 226, 228, 230 are arranged to the rear moving frame 212 so as to function as interval rings.

The dependent moving pins 234, 236 of the front moving frame 210 and the rear moving frame 212 are put into the cam grooves 120, 122 formed on the side cam cylinder 32. With this arrangement, the side cam cylinder 32 is rotated to thereby move the first frame 210 and the second frame 212 back and forth on the finder optical axis 216 along the cam grooves 120, 122, and a subject image is formed at the eyepiece at almost the same magnification as that of the subject image which is varied by the first moving frame 24 and the second moving frame 26.

On the other hand, the display plate 126 is placed at the rear of the rear moving frame 212 through a guide pole 238. The frond end of the guide pole 238 is supported by a hole portion 209 formed on the fixed frame 208, and the rear end thereof is supported with a hole portion 203 formed on the finder main body 202. The fixed frame is fixed to the front of the guide plate 214 in the finder main body 202 with the screws 240, 240.

The display plate 126 is forced counterclockwise in FIG. 3 by a torsion spring 254 and the front end 126A is touched to a stopper 256 to thereby position the display plate 126 out of the finder visual field. The side cam cylinder 32 is rotated to the last end of the tele side, whereby the rear end 128 is pushed to the cam 124 of the side cam cylinder 32 and the display plate 126 is rotated clockwise against the pushing force of the torsion spring 254 so as to enter the finder visual field shown by a two-dot chain line in FIG. 3. In this way, the display plate 126 is entered into and retracted from the finder visual frame with the cam of the side cam cylinder 32.

On the other hand, a first prism 242 is provided at the rear of the rear moving frame 212, as shown in FIG. 7, and stored in a prism frame 243. With this arrangement, a ray incident on the front of the first prism 242 is reflected by 90° with the first prism 242 so as to be outgoing upward. A visual field frame 244 is provided at the position where the outgoing ray forms image.

A second prism 246 is provided above the visual field frame 244 and stored in a prism frame 248. With this arrangement, a ray incident on the bottom of the second prism 246 is reflected by 90° with the second prism 246 so as to be outgoing to the rear eyepiece.

A spacer 250 is provided at the rear of the second prism 246, the ray reflected with the second prism 246 is outgoing to the eyepiece 252, shown in FIG. 4, through the spacer 250.

Then, an explanation will be given of the operation of the VTR 10 integrated with the camera, which has been structured as the above-described.

First, the motor 112 is driven normally and the side cam cylinder 32 shown in FIG. 3 is rotated clockwise (wide side direction), and then the first moving frame 24 is pulled by the tension spring 86 and moves forward on the photographing optical axis 34 with connecting coma 80, and the second moving frame 28 moves backward along the cam 118 on the photographing optical axis 34. With this arrangement, the photographing magnification can be changed to the wide side. The first moving frame 24 is projected from the front of the body of the VTR 10 shown in FIG. 1 when it is let out to the wide end. The front moving frame 210 and the rear moving frame 212 are moved back and forth on the finder optical axis 216 alone the cam grooves 120, 122 of the side cam cylinder 32 interlocking with the moving of the first moving frame 24 and the second moving frame 28, whereby the subject image which has the almost the same magnification as the magnification varied by the photographing optical system is formed on the eyepiece 252 of the finder.

Next, the motor 112 is driven reversely and the side cam cylinder 32 shown in FIG. 3 is rotated counterclockwise (tele side direction), and then the first moving frame 24 is pushed by the connecting coma 80 and moves backward on the photographing optical axis 34, and the second moving frame 28 moves forward along the cam 118 on the photographing optical axis 34. With this arrangement, the photographing magnification can be changed to the tele side. The first moving frame 24 is stored in the case 18 when it is let out to the tele end. The front moving frame 210 and the rear moving frame 212 are moved back and forth on the finder optical axis 216 along the cam grooves 120, 122 of the side cam cylinder 32 interlocking with the moving of the first moving frame 24 and the second moving frame 28, whereby the subject image which has the almost same magnification as the magnification varied by the photographing optical system is formed on the eyepiece 252 of the finder.

After photographing, when the power switch of the camera is turned off, the side cam cylinder 32 is rotated to the final end of the tele side by the motor. With cam 124 of the side cam cylinder 32, the display plate is rotated against the pushing force of the torsion spring 254 and the front end 126 is positioned in the finder visual field, and then the motor 112 is stopped. Therefore, when the finder is looked in and the projectile piece 126A is objected, it is easily considered that the power switch of the camera is turned off.

When the power switch of the camera is turned on, the side cam cylinder 32 is rotated in the opposite direction to the above-mentioned action. Therefore, when the finder is looked in, the display plate 126A is not objected so that it is considered that the power switch is turned on.

In this embodiment, the common side cam cylinder 32 is used for the lens driving mechanisms of the photographing optical system and the finder optical system so that the lens driving mechanism can become simple.

In this embodiment, the side cam cylinder 32 is used for the driving mechanism for the display plate 126 so that the driving mechanism can become even more simple.

Further, in this embodiment, the case 18 of the photographing optical system and the finder main body of the finder optical system are combined and formed in one common case, so that assembling is easier than a case that they are attached to the camera, respectively.

As described before, according to the camera of the present invention, the common cam cylinder is used for the lens mechanisms of the photographing optical system and the finder optical system, so that the lens driving mechanism can become simple.

The cam cylinder is used for the driving mechanism of the display member, therefore, the driving mechanism can become even more simple.

Further, the case of the photographing optical system and the case of the finder optical system are combined and formed in one common case, therefore, the assembling becomes easier.

Now, a detailed description will hereafter be given of the preferred embodiment of the zoom lens system applied to the camera according to the second present invention. Incidentally, the same numeral number is used for the same member as the member in the above-mentioned embodiment, and the explanation is omitted.

When the first moving frame 24 and the second moving frame 28 are let out to the wide end and an external force is applied to the front frame 20 which projects from the front of the body of the camera 10, the first moving frame 24 separates from the connecting coma 80 against the pushing force of the spring 86 to thereby move backward on the photographing optical axis 34. That is, the external force is absorbed by the stretch of the spring 86.

When no external force is applied, the first moving frame 24 returns to the initial position by the pushing force of the spring 86.

Therefore, according to the zoom lens system 16 in this embodiment, though an external force is applied to the first moving frame 24 which is projected from the front of the body of the camera 10, no side cam cylinder 32 and/or no dependent moving pin 130 are damaged.

As described before, according to the zoom lens system applied to the camera of the present invention, the moving lens frame and the connecting member are connected by the elastic member which pushes them in the direction approaching each other, so that the moving lens frame is moved backward on the photographing optical force against the elastic member when the external force is applied to the moving lens frame which projects from the front of the camera body. With this arrangement, the external force can be absorbed, therefore, no damage is given to the cam follower, the cam groove or the like.

Next, a detailed description will hereafter be given of the preferred embodiment of the zoom lens system applied to the camera according to the third present invention. Incidentally, the same numeral number is used for the same member as the member in the above-mentioned embodiment, and the explanation is omitted.

The dependent moving pin 132 of the second moving frame 28 shown in FIG. 6 is put into the cam 118. Thus, when the side cam cylinder 32 is rotated, the first moving frame 24 and the second moving frame 28 move back and forth along the cams 116, 118 in the direction approaching each other (tele side direction) and the direction separating each other (wide side direction) to thereby zoom, and then the subject image is formed on the focal surface of the CCD 30 through the lowpass filter 31 shown in FIG. 4.

The first moving frame 24 and the second moving frame 28 are formed in square cylinder shapes in which the rear ends are opened, and when the first moving frame 24 and the second moving frame 28 move to the most approached position (tele end position), the front portion of the second moving frame 28 is put into the opening 24A of the first moving frame 24. With this arrangement, the space 134 between the first moving frame 24 and the second moving frame 28 can be sealed up.

Figure 9:
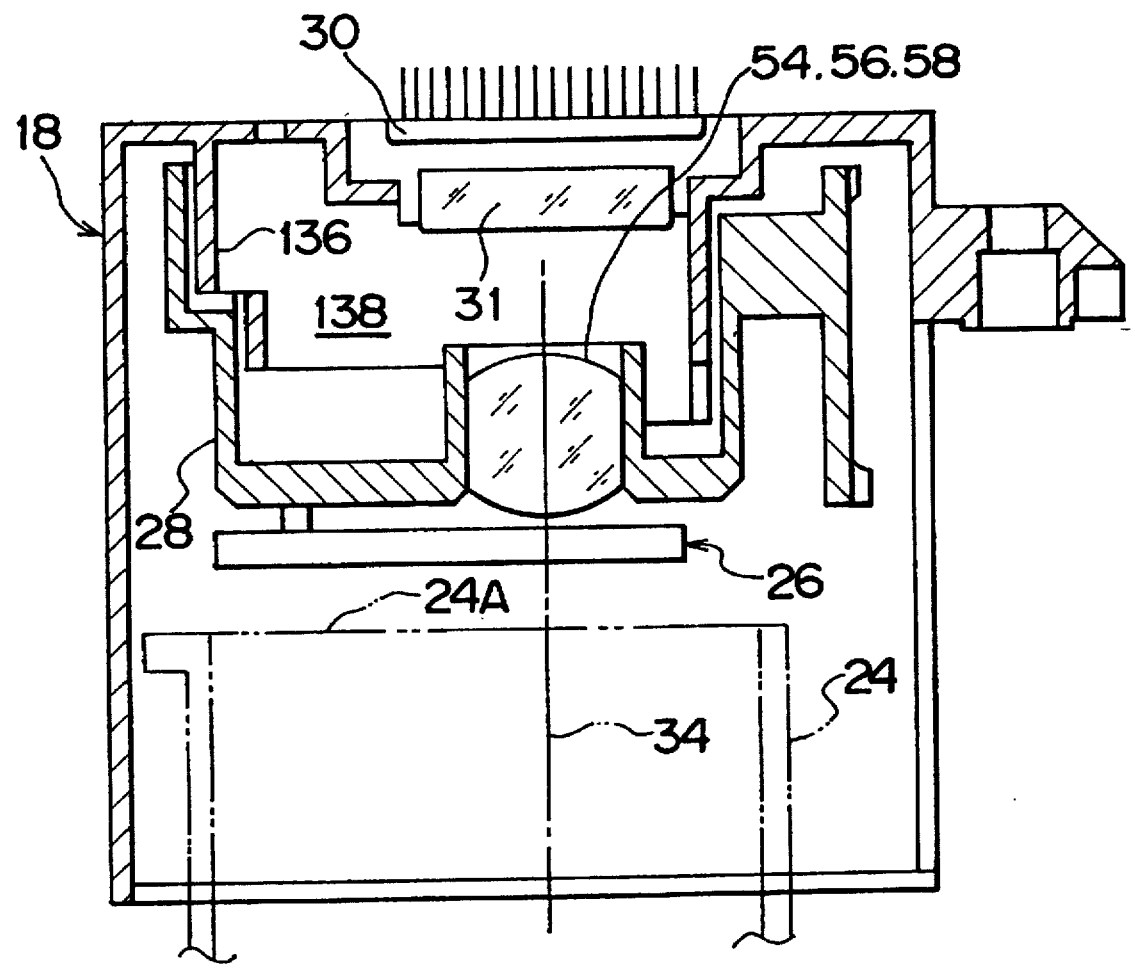
FIG. 9 is a sectional view showing a state in that the second moving frame of the zoom lens system applied to the camera according to the present invention which is positioned at a wide end.

Further, a cylinder portion 136 is formed and projected forward and around the lowpass filter 31 of the CCD 30 at the rear end of the case 18. The second moving frame 28 moves within the zooming movement scope from the tele end position shown in FIG. 4 to the wide end position shown in FIG. 9 in the state that the second moving frame 28 is put into the cylinder portion 136. With this arrangement, the space 138 between the second moving frame 28 and the case 18 can be sealed up.

Then, an explanation will be given of the operation of the zoom lens system, which has been structured as the above-described.

In the zoom lens system of this embodiment, the second moving frame 28 moves within the zooming movement scope from the tele end position to the wide end position in the state the second moving frame 28 is put into the cylinder portion 136 formed in the case 18.

Therefore, in this embodiment, the space 138 near the lowpass filter 31 is sealed up by the second moving frame 28 and the cylinder portion 136, so that no dust adheres to the lowpass filter 31 though dust enters the case 18. As a result, a clear image can be captured.

Further, in this embodiment, when the first moving frame 24 and the second moving frame 28 are moved to the tele end position, the first moving frame 24 and the second moving frame 28 are put together, so that the space 134 between the first frame 24 and the second moving frame 28 can be sealed up.

Therefore, in this embodiment, though dust enters the case 18, the dust and the like can be prevented from adhering to the lens group in the second moving frame 28.

Incidentally, in this embodiment, the description has been given of the case that two moving lens groups are applied to the zoom lens system, however, the present invention should not be limited to this, three or more moving lens groups may be applied to the zoom lens system.

As described before, according to the zoom lens system applied to the camera of the third present invention, the space near the focal surface is sealed up by putting together the taking lens frame shaped in a cylinder and the cylinder portion of the case, so that no dust adheres to the focal surface though dust and the like enter the case.

Further, according the third present invention, the space near the taking lens is sealed up by putting together the taking lens frames shaped in cylinders, so that no dust adheres to the taking lens though dust and the like enter the case.

Next, a detailed description will hereafter be given of the preferred embodiment of the zoom lens system applied to the camera according to the fourth present invention. Incidentally, the same numeral number is used for the same member as the member in the above-mentioned embodiment, and the explanation is omitted.

Figure 10:
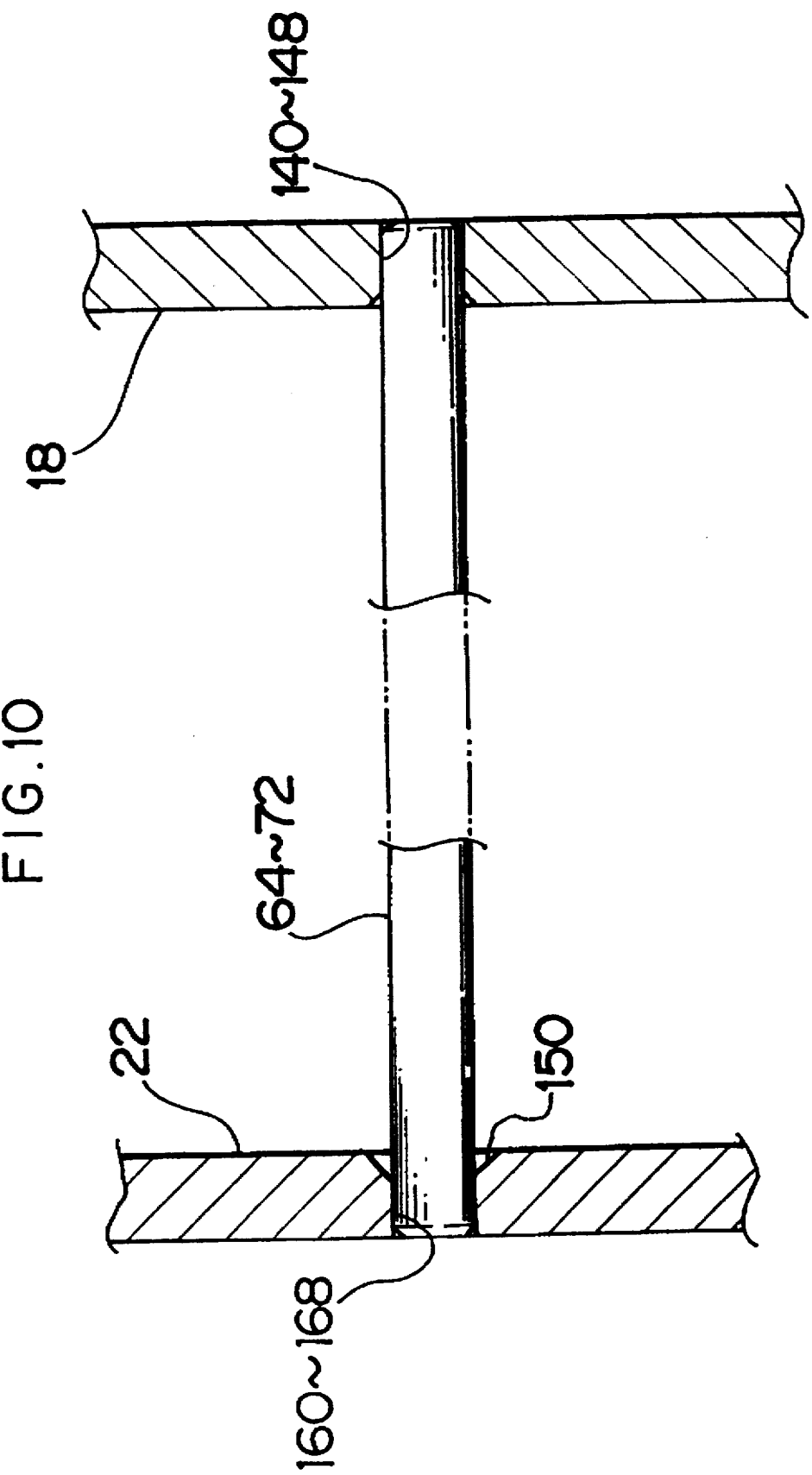
FIG. 10 is a sectional view showing a state of fixing a guide pole of the zoom lens system applied to the camera according to the present invention.

In the case 18, five guide poles 64, 66, 68, 70, 72 are arranged in parallel with the photographing axis 34. As shown in FIG. 5, the front ends of the guide poles 64–72 are press fitted into through holes 160, 162, 164, 166, 168 and the fixed to them, and, as shown in FIG. 10, the rear ends are press fitted into through holes 140, 142, 144, 146, 148 and the fixed. And, a taper surface 150 is formed at each entrance of the through holes 160–168. With this arrangement, the front ends of the guide poles 160–168 are guided by the taper surfaces 150, respectively, to thereby be put into the through holes 160–168.

Then, an explanation will be given of the operation of the zoom lens system, which has been as the above-described.

First, the rear end portions of the guide poles 64–72 in the zoom lens system are put into the through holes 140–148 formed on the rear wall portion of the case 18 under pressure and fixed, respectively. Therefore, the guide poles 64–72 are kept from falling down.

Next, the front end portions of the guide poles 64–72 are guided along the taper surfaces 150 at the entrances of the through holes 160–168 at the fixed frame 22, and are put into and fixed.

Therefore, in this embodiment, the front end portions of the guide poles 64–72 can be press fitted into the through holes 160–168 with the naked eye from the through holes 160–168 at the fixed frame 20, so that the guide poles 64–72 can be fitted to the case easily though there is a large number of the guide poles 64–72.

As described before, according to the zoom lens system applied to the camera of the fourth present invention, the rear end portion is press fitted the through hole formed at the rear end of the case and fixed; therefore, the guide pole can be kept from falling down. And, the front end portion can be press fitted into the through hole formed at the front end of the case with naked eye from the through hole, so that the guide pole can be fitted though there is a large number of the guide poles.

Further, according the fourth present invention, a guide surface in a taper shape is formed at the entrance of the through hole, so that the end portion of the guide pole can be guided to the through hole with this guide surface. Therefore, the guide pole can be fitted easily.

Next, a detailed description will hereafter be given of the preferred embodiment of the camera according to the fifth present invention. Incidentally, the same numeral number is used for the same member as the member in the above-mentioned embodiment, and the explanation is omitted.

Figure 11:
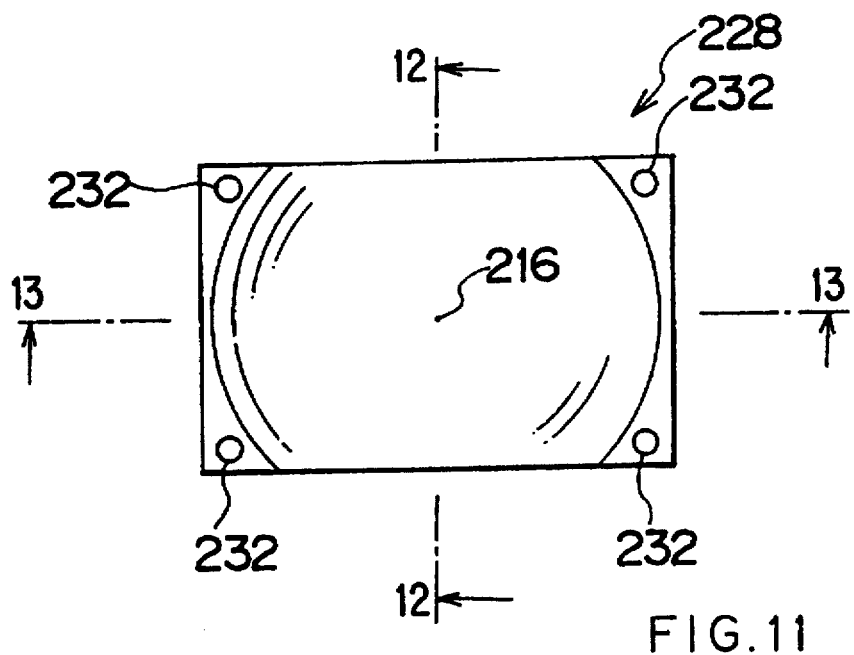
FIG. 11 is a front view showing a case in that a lens shape of a camera according to the present invention is concave.
Figure 12:
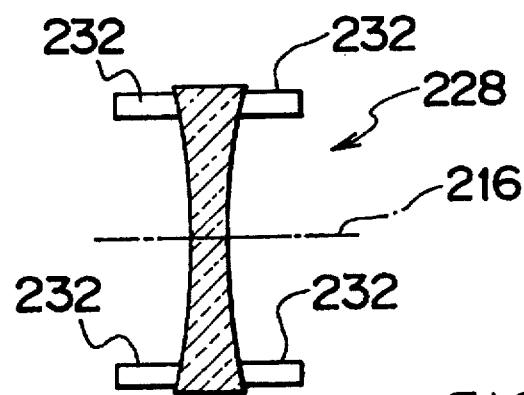
FIG. 12 is a sectional view taken on line 12—12 in FIG. 11.
Figure 13:
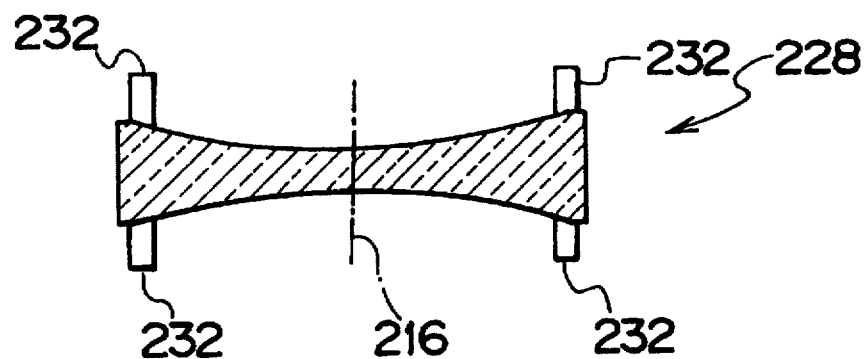
FIG. 13 is a sectional view taken on line 13—13 in FIG. 11.

As shown in FIG. 11, a lens 228 is formed in a rectangular shape from plastic, and, as shown in FIGS. 12 and 13, two interval pins 232, 232 . . . are formed and projected integrally in the direction of the finder optical axis 216 toward the lens 226 and the lens 230 at each four corner portions of the lens 228.

Figure 14:
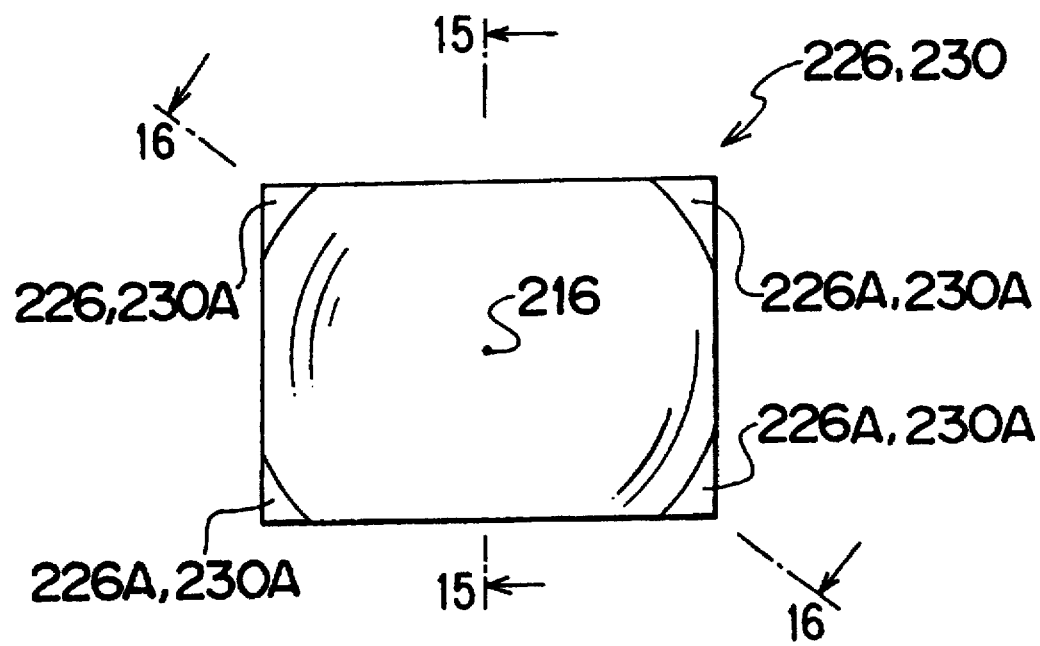
FIG. 14 is a front view showing a case in that a lens shape of a camera according to the present invention is convex.
Figure 15:
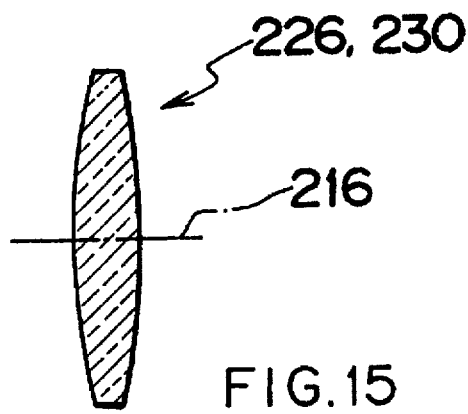
FIG. 15 is a sectional view taken on line 15—15 in FIG. 14.
Figure 16:
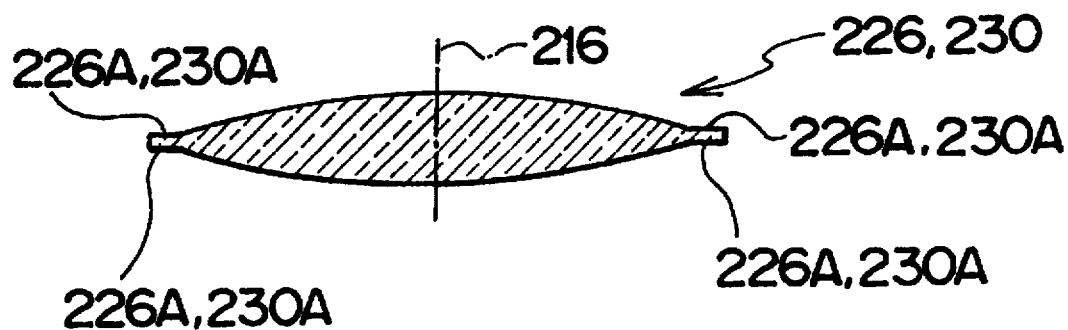
FIG. 16 is a sectional view taken on line 16—16 in FIG. 14.

As shown in FIG. 14, the lenses 226, 230 are formed in rectangular shapes and receiving portions 226A, 230A in flat shapes are formed at each four corner portions thereof. When the lenses 226, 228, 230 are attached to the rear moving frame 212, the interval pins 232, 232 . . . come in contact with the receiving portions 226A, 230A, respectively. As a result, the interval pins 232, 232 . . . are used for an interval ring.

Moreover, the lens 224 held by the first moving frame 210 is formed in the same rectangular shape as the lenses 226, 230.

Then, an explanation will be given of the operation of the zoom lens system and the finder portion, which have been structured as the above-described.

As to the lenses 226, 228, 230 held by the second moving frame 212 in the finder portion 200, first, the lens 226 is inserted in the second moving frame 212 and fixed. Next, the lens 228 is inserted in the second moving frame 212 and the interval pins 232, 232 . . . are contact with and fixed to the receiving portions 226A, 226A . . . formed at the corner portions of the lens 226. Then, the lens 230 is inserted in the second moving frame 212 and the receiving portions 230A, 230A . . . formed at the lens 230 are contact with and fixed to the interval pins 232, 232 . . . .

As a result, the lenses 226, 228, 230 can be held at a predetermined intervals with the interval pins 232, 232 . . . .

Therefore, according to the lens shape in this embodiment, the lens interval can be kept without interval rings, so that the number of the parts can be reduced and the lenses 226, 228, 230 can be fitted to the second moving frame 212 easily.

Further, in this embodiment, the interval pin 232 is formed at the corner portion of the rectangular lens 228, therefore, the lens 228 maintains good capability.

Moreover, in this embodiment, the four interval pins 232 are formed at the four corner portions of the lens 228, however, the aim may be achieved with three interval pins.

In this embodiment, the interval pins 232 are formed on the both sides, however, when two lenses are held, interval pins may be formed on side.

Further, in this embodiment, the description has been given of the lens shape used in the finder portion, however, the taking lenses used in the zoom lens system may be formed in the same shape as the above-described lens shape in the finder portion.

As described before, according to the camera of the fifth present invention, the cylindrical pins formed at the corner portions of the lens are in contact with the receiving portions consisting of the flat portions formed at the corner portions of the rectangular lens near the lens, whereby the lenses can be held at predetermined intervals, so that the number of parts can be reduced and the lenses can be fitted to the lens frame easily.

A detailed description will hereafter be given of the preferred embodiment of the camera according to the sixth present invention.

Figure 17:
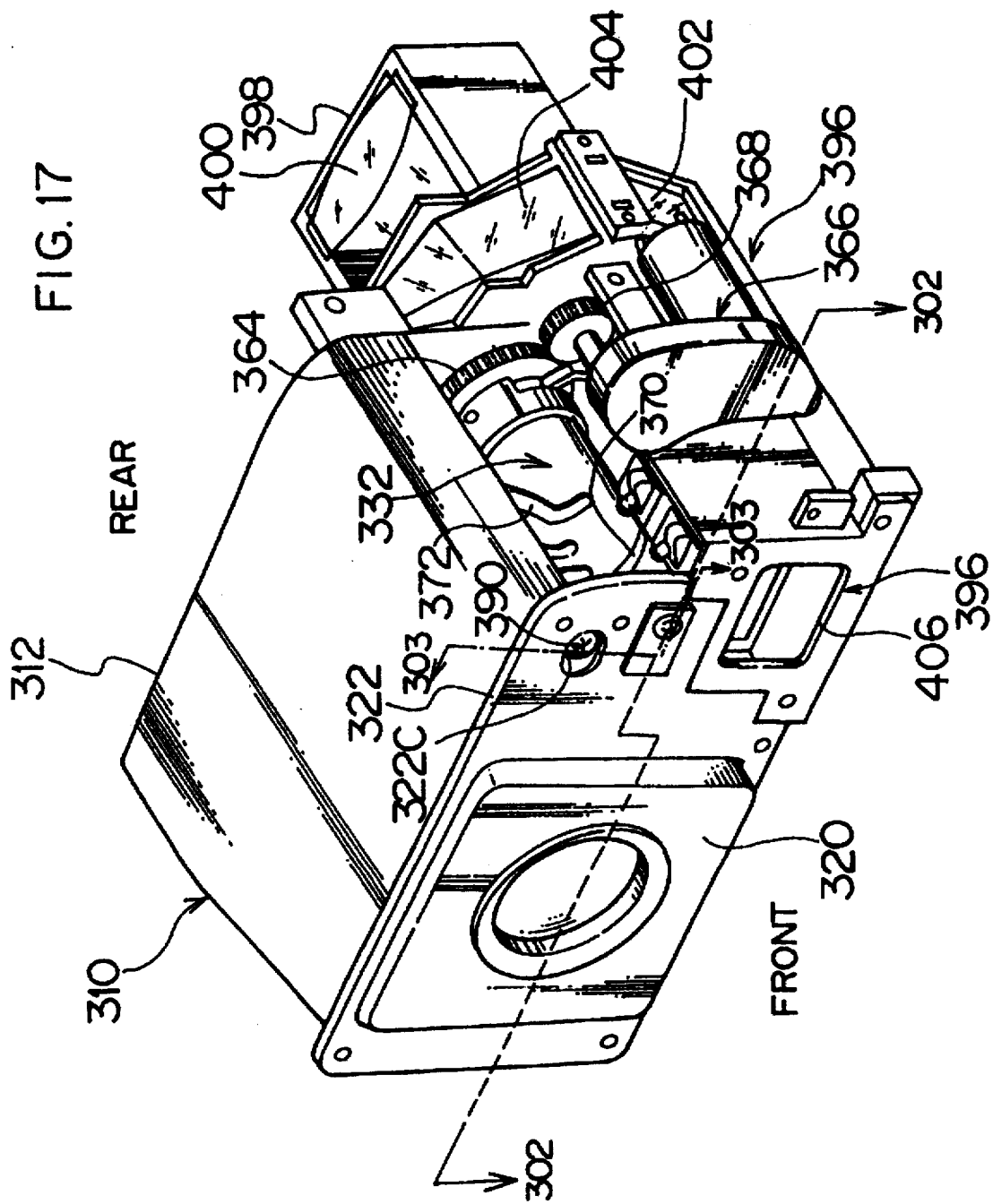
FIG. 17 is a respective view showing a zoom lens system applied to a camera according to the present invention.
Figure 18:
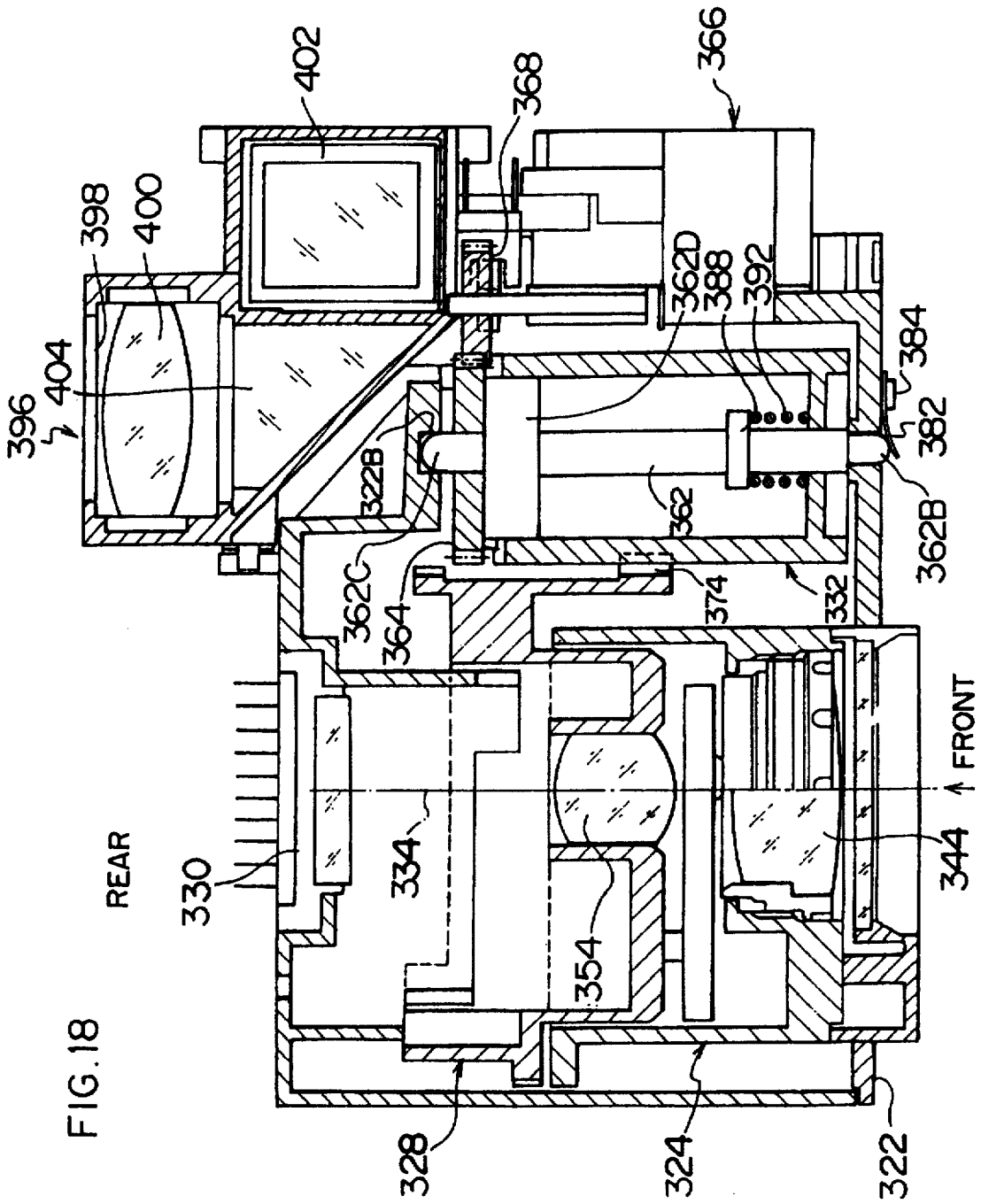
FIG. 18 is a sectional view taken on line 302—302 in FIG. 17.
Figure 19:
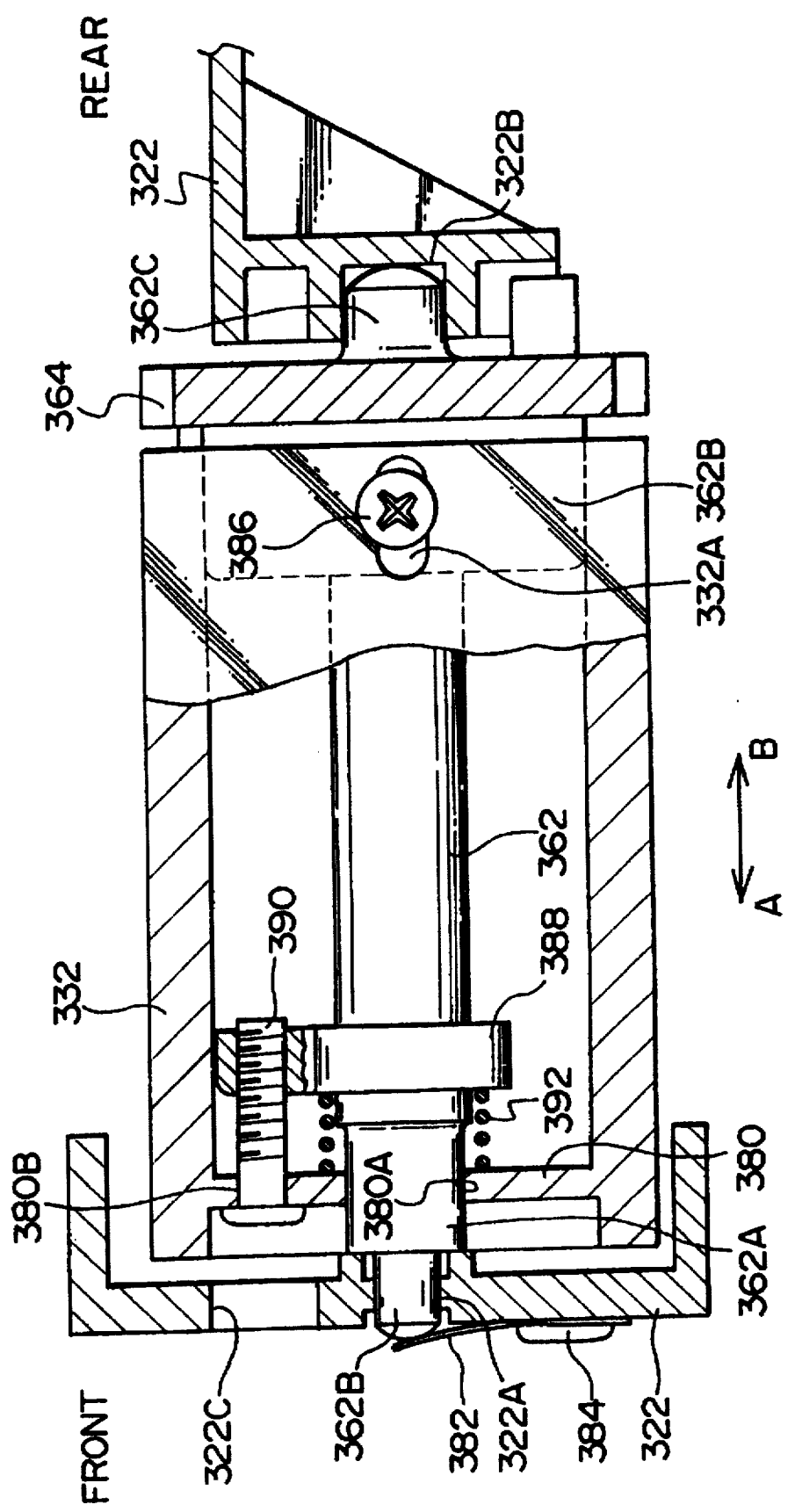
FIG. 19 is a sectional view taken on line 303—303 in FIG. 17.

FIG. 17 is a perspective view showing a zoom lens system of a camera according to the sixth present invention, FIG. 18 is a sectional view taken on line 302—302 in FIG. 17 and FIG. 19 is a sectional view taken on line 303—303 in FIG. 17. The zoom lens system 310 is provided with a case 312 and a first moving frame 324, a second moving frame 328 and a side cam cylinder 332 are stored in the case 312. The first moving frame 324 is placed at the front end portion of the zoom lens system 310 and the second moving frame 328 is positioned behind the first moving frame 324. The side cam cylinder 332 is arranged at the right side of the first moving frame 328 and the second moving frame 324.

A first taking lens group 344 is attached to the first moving frame 324 and a second taking lens group 354 is attached to the second moving frame 328. The optical axis of the first taking lens group 344 and the optical axis of the second taking lens group 354 are arranged on a photographing optical axis 334. The first moving frame 324 and the second moving frame 328 are supported movably in the direction of the photographing optical axis 334 (that is, the back and forth direction of the zoom lens system 310) within the case 312 through guide poles (not shown).

A CCD unit 330 is fixed behind the first moving frame 324 and the second moving frame 328. The side cam cylinder 332, which is placed at the right side of the first moving frame 324 and the second moving frame 328, is arranged in parallel with the photographing optical axis 334, and an axis, described later, is put into the side cam cylinder 332. A gear 364 is formed integrally with the axis 362, and the gear 364 is engaged with a gear 368 of a motor 366.

Cam grooves 370, 372 are formed on the peripheral surface of the side cam cylinder 332, and a dependent moving pin (not shown) of the first moving frame 324 and a dependent moving pin 374 of the second moving frame 324 are put into the cam groove 370 and the cam groove 372 movably, respectively. As a result, the driving power from the motor 366 is given to the side cam cylinder 332 through the gears 368, 364, whereby the side cam cylinder 332 rotates. In this case, the first moving frame 324 and the second moving frame 328 move back and forth on the photographing optical axis 334 along the cams 370, 372 in the direction approaching each other (tele side direction) and the direction separating each other (wide side direction). With this arrangement, the photographing magnification of the subject image varies.

Further, a plate 380 is formed at the front end portion of the side cam cylinder 332, and an opening hole 380A is formed on the same axis as the side cam cylinder 332 in the plate 380. The front end portion 362A of the above-mentioned axis 362 is put into the opening hole 380A. A point pin 362B is formed at the point end of the front end portion 362A coaxially, and the point pin 362B is put into the opening hole 322A of the fixed frame 322. A point pin 362B is projected slightly from the fixed frame 322, and the projected point pin 362B is contact with a flat spring 382. The flat spring 382 is fixed to the fixed frame 322 by a screw 384. Then, the point pin 362B is pushed back with the flat spring 382.

Moreover, a rear end pin 362C is formed at the rear end portion of the axis 362 coaxially and put into a concave portion 322B of the fixed frame 322. The concave portion 322B is formed at the rear end of the fixed frame 322 near the focal surface of the CCD unit 330. And, the point pin 362B of the axis 362 is pushed by the flat spring 382, so that the rear end pin 362C of the axis 362 come in contact with the bottom of the concave portion 322B. Therefore, the axis 362 is positioned with reference to the bottom of the concave portion 322B. And, the axis 362 rotates around the axial line, however, it is restricted to move back and forth (arrow A–B direction).

A flange 362D is formed at the rear end portion of the axis 362 and supported slidably with the rear end portion of the side cam cylinder 332. A slot 332A, which extends in the direction of the axial line, is formed at the rear end portion of the side cam cylinder 332. A screw 386 is put into the slot 332A and connected to the flange 362D threadly. As a result, the side cam cylinder 332 moves back and forth (arrow A–B direction) independently from the axis 362, and the side cam cylinder 332 rotates around the axial line integrally with the axis 362.

A stopper 388 is formed at the front end portion of the axis 362 and connected with an adjustment screw 390 threadly. The adjustment screw 390 is supported rotatably with the opening hole 380B of the plate 380. And, a compression spring 392 is arranged between the stopper 388 and the plate 380 and pushes the side cam cylinder 332 in the forth direction (arrow A direction) through the plate 380. Therefore, the plate 380 of the side cam cylinder 332 comes contact with the head portion of the adjustment screw 390. And, since the side cam cylinder 332 is forced by the compression spring 392 in the forth direction (arrow A direction), the weakness between the adjustment screw 390 and the stopper 388 can be eliminated.

Further, an opening hole 322C for adjustment is formed in front of the adjustment screw 390 of the fixed frame 322, and the adjustment screw 390 can be rotated from the front through the opening hole 322C. Then, when the adjustment screw 390 is rotated clockwise, the side cam cylinder 332 moves in the arrow B direction against the pushing force of the compression spring 392, and when the adjustment screw 390 is rotated counterclockwise, the side cam cylinder 332 moves in the arrow A direction by the pushing force of the compression spring 392.

In this case, as described above, the first moving frame 324 and the second moving frame 328 are connected with the side cam cylinder 332 through the cam groove 370 and the cam groove 372, therefore, when the side cam cylinder 332 moves back and forth, the first moving frame 324 and the second moving frame 328 are moved back and forth along the photographing optical axis 334 together with the side came cylinder 332. That is, the adjustment screw 390 is rotated clockwise or counterclockwise, whereby the first and second lens groups 344, 354 are adjusted about the back focus, and the focal point of the first and second lens groups 344, 354 is fitted on the focal surface of the CCD unit 330.

Since the axis 362 is positioned by the pushing force of the flat spring 382 with reference to the bottom of the concave portion 322B, the first and second lens groups 344, 354 are positioned with reference to the bottom of the concave portion 322B. Therefore, the first and second lens groups 344, 354 are positioned with reference to the vicinity of the focal surface of the CCD unit 330.

Incidentally, a numeral number 396 indicates a finder in FIGS. 17 and 18, and the finder 396 is provided with a finder eyepiece 398, an eyepiece lens 400, a first prism 402, a second prism 404 (see FIG. 17) and an opening portion 406. The subject ray incident into the opening portion 406 is guided by the finder 390 through the first prism 402 to the second prism 404, and then the subject ray guided by the second prism 404 forms a subject image on the finder eyepiece 398 through the eyepiece lens 400.

Then, an explanation will be given of the operation of the zoom lens system, which have been structured as the above-described.

First, a driver is put into the adjustment screw 390 through opening hole 322C from the front of the zoom lens system 310, and then the adjustment screw 390 is rotated clockwise or counterclockwise with the driver. When the adjustment screw 390 rotates clockwise or counterclockwise, the side cam cylinder moves back and forth (arrow A-B direction), and then the first moving frame 324 and the second moving frame 328 move along the photographing optical axis 334 in the arrow A-B direction together with the side cam cylinder 332. The driver is rotated in a manner that the focus point of the first and second lens groups 344, 354 is adjusted on the focal surface of the CCD unit 330, and then the adjustment screw 390 is rotated clockwise or counterclockwise. And, when the focus point of the first and second lens groups 344, 354 is fitted on the focal surface of the CCD unit 330, the adjustment screw 390 is stopped rotating, and then the side cam cylinder 332 and the axis 362 are fixed with a screw, not shown. With this arrangement, the back focus adjustment is completed.

In this case, since the axis 362 is positioned with reference to the bottom of the concave portion 322B, the first and second lens groups 344, 354 are positioned with reference to the bottom of the concave portion 322B. Therefore, though the case expands or contracts by the temperature change, the positional gap of the first and second lens groups 344, 354 in regard to the focal surface of the CCD unit 330 can be controlled. In this way, the positional relationship of the first and second lens groups 344, 354 in regard to the focal surface of the CCD unit 330 can be kept in the state that the back focus can be adjustment, so that the focus point of the subject image is not out of focus.

Further, the adjustment screw 390 can be rotated with the screw from the front of the zoom lens system 310, therefore, though the finder 396 is attached to the zoom lens system 310 and the rear of the zoom lens system 310 is covered with the finder 396, the back focus can be adjusted.

As described before, according to the zoom lens system in the camera of the sixth present invention, the rear end portion of the axis is contact with the rear end of the case by the pushing force of the pushing means, so that the moving lens groups are positioned through the cam cylinder with reference to the rear end of the case. Therefore, though the case expands or contracts by the temperature change, the positional gap of the moving lens groups in regard to the focal surface at the rear end of the case can be controlled. In this way, when the case expands or contracts by the temperature change, the positional relationship of the moving lens groups in regard to the focal surface can be kept in the state that the back focus can be adjustment, so that the focus point of the subject image is not out of focus.

Further, the adjustment screw member is rotated from the front of the zoom lens so as to move the moving lens groups through the cam cylinder in the optical axis direction, whereby the back focus is adjusted, therefore, though the finder is attached to the zoom lens system and the rear of the zoom lens system is covered with the finder, the back focus can be adjusted.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A camera comprises:

a photographing optical system for holding taking lens groups and provided with a taking lens frame which is movable back and forth along a photographing optical axis;

a finder optical system for holding finder lens groups and provided with a finder lens frame which is movable back and forth along a finder optical axis;

a connecting member provided with a cam follower;

a cam cylinder provided with cam grooves on a peripheral surface, into which respective cam followers projected from said connecting member and said finder lens frame are put; and an elastic member for connecting said taking lens frame and said connecting member by forcing in a direction approaching each other; wherein said cam cylinder is rotated so as to move said taking lens frame back and forth through said elastic member and said connecting member and said finder lens frame back and forth along said cam grooves respectively, so that a photographing magnification and a finder magnification are changed and corresponded;

said cam cylinder being a side cam cylinder, which is parallel to said photographing optical axis of said photographing optical system and said finder optical axis of said finder optical system, and which is rotatably arranged around an axis that is different from said photographing axis and said finder optical axis.

2. A camera as set forth in claim 1, wherein a display member showing an on-off state of a power switch of the camera is arranged in a visual field of said finder optical system enterably and retractably, and said cam cylinder drives and controls said display member so as to enter the visual field of the finder optical system when said power switch is set off.

3. A camera as set forth in claim 2, wherein a case of said photographing optical system and a case of said finder optical system are combined so as to form a common case.

4. A camera as set forth in claim 1, wherein said cam cylinder is located at a side of said optical system and at one of an upper side and a lower side of said finder optical system.

5. A camera provided with a zoom lens system comprises:
   a camera body;
   a moving lens frame for holding taking lenses and movable back and forth along a photographing optical axis in a case;
   a connecting member provided with a cam follower;
   a cam cylinder provided with cam grooves into which the cam follower of said connecting member is put, and rotated so as to move the connecting member back and forth along the photographing optical axis; and
   an elastic member for connecting said moving lens frame and said connecting member by forcing in a direction approaching each other; wherein said cam cylinder is rotated to thereby move the moving lens frame back and forth through said elastic member and said connecting member, so that a photographing magnification is changed;
   said moving lens frame being movable to the rear of the photographing optical axis in response to external force applied to said moving lens frame that is projected from the front of the camera body.

6. A camera as set forth in claim 5, wherein said moving lens frame is guided with guide poles movably and said connecting member is guided with said guide poles so as to be moveable back and forth along the photographing optical axis.

7. In a camera provided with a zoom lens system in which plural taking lens frames for holding taking lenses are moved back and forth along a photographing optical axis in a case so as to zoom, and a subject image is formed on a focal surface arranged at a rear end of said case:
   a rear taking lens frame of the plural taking lens frames is formed in a cylinder shape of which a rear end is open; and,
   a cylinder portion that surrounds said focal surface is provided and projected forward along the photographing optical axis at a rear end in the case, and the rear taking lens frame moves back and forth in a state that it is overlapped with the cylinder portion of the case.

8. A camera provided with a zoom lens system as set forth in claim 7, wherein a front taking lens frame of the plural taking lens frames is formed in a cylinder shape of which a rear end is open, and the front taking lens frame moves back and forth in a part of a moving scope in a state that it is overlapped with the rear taking lens frame.

9. A camera comprising a lens of a rectangular shape having integrally formed pins in cylinder shapes at corner portions and an adjacent lens of a rectangular shape having receiving portions corresponding to the integrally formed pins at corner portions, wherein said receiving portions are flat portions and the integrally formed pins contact the receiving portions, thereby maintaining a lens interval at a fixed and predetermined distance.

10. A camera as set forth in claim 9, wherein a pin is integrally formed at each corner portion.

11. A camera comprises:
   a photographing optical system for holding taking lens groups and provided with a taking lens frame, which is movable back and forth along a photographing optical axis, in a case;
   a cam cylinder provided with a cam groove on a peripheral surface, into which a cam follower projected from said taking lens frame is put, and rotated so as to move said taking lens frame back and forth along said cam groove, so that a photographing magnification is changed;
   an axis stored in said cam cylinder coaxially for supporting said cam cylinder movably in said optical axis direction and supported rotatably at a front end portion and a rear end portion by said case;
   forcing means for forcing said axis backward such that the rear end portion of said axis comes contact with said case; and,
   an adjustment screw member for connecting said cam cylinder and said axis and for moving said cam cylinder in regard to the axis in said optical axis direction by being rotated from a front of said case; wherein said adjustment member is rotated so as to move said photographing lens groups through said cam cylinder in said optical axis direction, whereby said photographing lens groups are focused on a focal surface at the rear end portion of said case.

12. A camera as set forth in claim 11, wherein said forcing means is a flat spring, and the flat spring is arranged at a front end portion of said case and abuts a front end portion of said axis so as to force said axis backward.

13. A camera as set forth in claim 11, wherein said zoom lens system includes an elastic member placed between said cam cylinder and said axis for forcing said cam cylinder in one of said optical axis direction.

* * * * *